US009509577B2

(12) United States Patent
Sullivan

(10) Patent No.: US 9,509,577 B2
(45) Date of Patent: Nov. 29, 2016

(54) SYSTEM AND METHOD FOR HARDWARE AND SOFTWARE MONITORING WITH INTEGRATED RESOURCE ACQUISITION

(71) Applicant: SPICEWORKS, INC., Austin, TX (US)

(72) Inventor: Francis Sullivan, Austin, TX (US)

(73) Assignee: Spiceworks, Inc., Austin, TX (US)

( * ) Notice: Subject to any disclaimer, the term of this patent is extended or adjusted under 35 U.S.C. 154(b) by 0 days.

(21) Appl. No.: 14/558,444

(22) Filed: Dec. 2, 2014

(65) Prior Publication Data

US 2015/0089055 A1 Mar. 26, 2015

Related U.S. Application Data

(63) Continuation of application No. 12/041,480, filed on Mar. 3, 2008, now abandoned.

(60) Provisional application No. 60/892,831, filed on Mar. 2, 2007.

(51) Int. Cl.
*G06F 15/173* (2006.01)
*H04L 12/26* (2006.01)
*H04L 29/08* (2006.01)
*H04L 12/24* (2006.01)

(52) U.S. Cl.
CPC ............ *H04L 43/04* (2013.01); *H04L 41/22* (2013.01); *H04L 41/5012* (2013.01); *H04L 41/5064* (2013.01); *H04L 43/10* (2013.01); *H04L 67/125* (2013.01); *H04L 41/0213* (2013.01)

(58) Field of Classification Search
CPC ............ H04L 67/125; H04L 41/5064; H04L 41/5012; H04L 41/0213

USPC ......................................................... 709/224
See application file for complete search history.

(56) References Cited

U.S. PATENT DOCUMENTS

| | | | | | |
|---|---|---|---|---|---|
| 6,664,978 | B1 * | 12/2003 | Kekic | ................ | H04L 41/0213 709/203 |
| 7,620,848 | B1 * | 11/2009 | Tanner | ............... | G06F 11/0709 709/224 |
| 2006/0282886 | A1 * | 12/2006 | Gaug | ..................... | H04L 63/20 726/5 |
| 2007/0039047 | A1 * | 2/2007 | Chen | ..................... | H04L 63/20 726/22 |
| 2007/0174732 | A1 * | 7/2007 | Irby | .................... | G06F 11/0748 714/47.2 |

\* cited by examiner

*Primary Examiner* — Joseph Greene
(74) *Attorney, Agent, or Firm* — Hulsey P.C.

(57) ABSTRACT

A method, system, and network providing hardware and software inventorying and monitoring provide the status of a local network of interconnected information technology devices. A user downloads and installs a local network monitoring software program from an online source onto a host computer system. The local network monitoring software system initiates an inventory of all information technology devices associated with said local network of information technology devices. Also, the local network monitoring software determines the operational status of the information technology devices and the status of software programs installed on the information technology devices. The results of the inventory and status determinations are presented to the host computer system. The presented information permits the user of said host computer system to initiate maintenance and support actions for the information technology devices in response to the operational status and status of software programs using the local network monitoring software.

18 Claims, 24 Drawing Sheets

SYSTEM AND METHOD FOR HARDWARE AND SOFTWARE MONITORING WITH INTEGRATED RESOURCE ACQUISITION

RELATED APPLICATIONS

This U.S. Patent Application claims priority of U.S. Non-Provisional patent application Ser. No. 12/041,480, filed Mar. 3, 2008, which claims priority of U.S. Provisional Patent Application Ser. No. 60/892,831, filed Mar. 2, 2007.

All the fore-mentioned applications are hereby incorporated by reference in their entirety.

FIELD

The present disclosure relates in general to the field of software, and more particularly to information technology management software.

BACKGROUND

Existing information technology (IT) management software packages have several shortcomings. Existing IT management software packages are often complicated. Often, such software packages are geared toward professional IT personnel in large businesses, neglecting small and medium sized businesses. While the presentation of large amounts of information may be beneficial in certain contexts, it is often unnecessary and overwhelming for less sophisticated IT management personnel.

Existing IT management software packages may not integrate important data into a single interface. One IT management software package may be more effective for managing one issue, while another may be more effective for another issue. An IT manager may need to review many disparate sources of information in order to effectively manage the IT infrastructure. Common management issues are often mixed with the less commonly encountered issues, making it tedious and time consuming to filter the common issues from the less common issues.

Accordingly, there is a need for an IT management software package that addresses the shortcomings of existing IT management software noted above.

There is a further need for an IT management software package that is easy to use, integrated and directed to common IT management issues.

SUMMARY

In one aspect, embodiments disclosed herein relate to a system for hardware and software monitoring with integrated resource acquisition.

In another aspect, the present disclosure provides a method, system, and network providing hardware and software inventorying and monitoring provide the status of a local network of interconnected information technology devices. A user downloads and installs a local network monitoring software program from an online source onto a host computer system. The local network monitoring software system initiates an inventory of all information technology devices associated with said local network of information technology devices. Also, the local network monitoring software determines the operational status of the information technology devices and the status of software programs installed on the information technology devices. The results of the inventory and status determinations are presented to the host computer system. The presented information permits the user of said host computer system to initiate maintenance and support actions for the information technology devices in response to the operational status and status of software programs using the local network monitoring software.

Other aspects and advantages of the disclosure will be apparent from the following description and the appended claims.

BRIEF DESCRIPTION OF THE DRAWINGS

The features, nature, and advantages of the disclosed subject matter may become more apparent from the detailed description set forth below when taken in conjunction with the drawings in which like reference characters identify correspondingly throughout and wherein.

DETAILED DESCRIPTION OF THE DISCLOSURE

Figure 1:
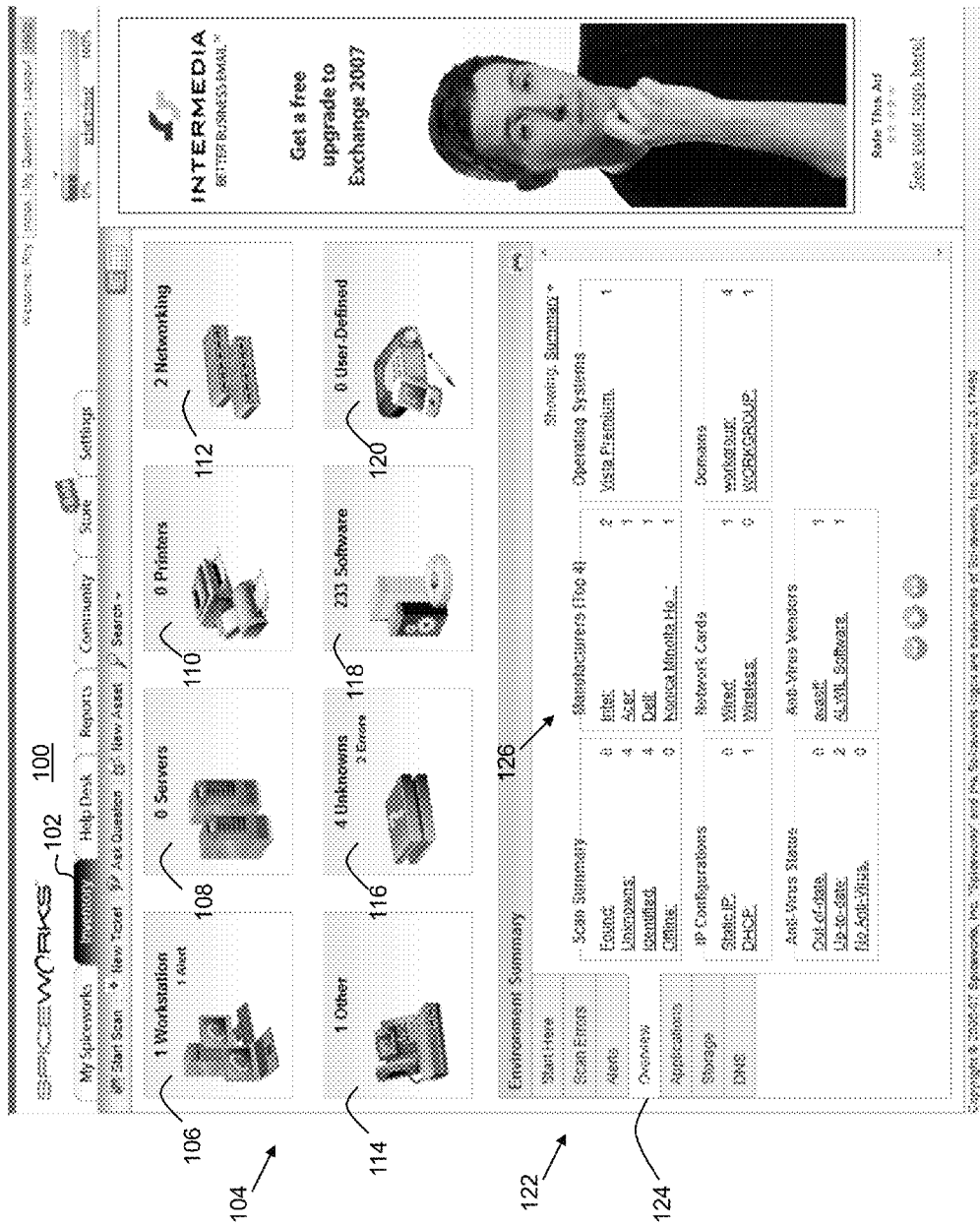
FIGS. 1 through 11 show views of the inventory tab of one embodiment of the disclosed subject matter.

Preferred embodiments of the present disclosure are illustrated in the drawings, like numbers being used to refer to like and corresponding parts of the various drawings.

The disclosed subject matter relates to IT management software. Features of the disclosed subject matter include the ability to inventory a network, run an IT help desk, monitor a network for trouble, report on a network, troubleshoot issues on a network, collaborate with IT professionals, and provide feedback for software improvement.

The disclosed subject matter allows for an inventory of all hardware, software and other assets on a network. The software allows for discovery of the Windows, Mac, and Linux PCs and servers, routers, printers and any other IP-based devices on your network. All relevant technical data plus the software, patches and services on each machine may be gathered. Other data such as number of licenses, purchase price and physical location may also be added. Other assets such as mobile phones and office furniture may also be added. All of this information may be gathered without the use of agents. All inventory information may be stored locally and securely on the network, avoiding any concerns about sensitive information being communicated over the internet.

FIG. 1 shows a view 100 of an embodiment of an inventory tab 102 of the present disclosure. The inventory tab 102 allows a user to determine the hardware and software installed in an environment and to take action on that data. The top half of the screen 104 shows the major categories that assets are automatically sorted into upon discovery. In the embodiment shown, the categories include Workstations 106, Servers 108, Printers 110, Networking 112, Other 114, Unknowns 116, Software 118 and User-Defined 120. The bottom half of the screen 122 shows Overview tab 124, displaying the assets discovered in the environment and allowing a user to quickly see any issues. In the embodiment shown, the Overview tab 124 shows the top manufacturers, operating systems, anti-virus vendors and status information along with the number of assets discovered in each category. In one embodiment, underlined data indicates that a user may perform some kind of action on that data. For example, under the Manufacturers (Top 4) tab 126, if a user wishes to see assets manufactured by Dell, a user may click the Dell link to receive a filtered view of environment data. Similarly, to see all assets not manufactured by Dell, a user may hover over the Dell link and see 'Others not like this' (not shown).

Figure 2:
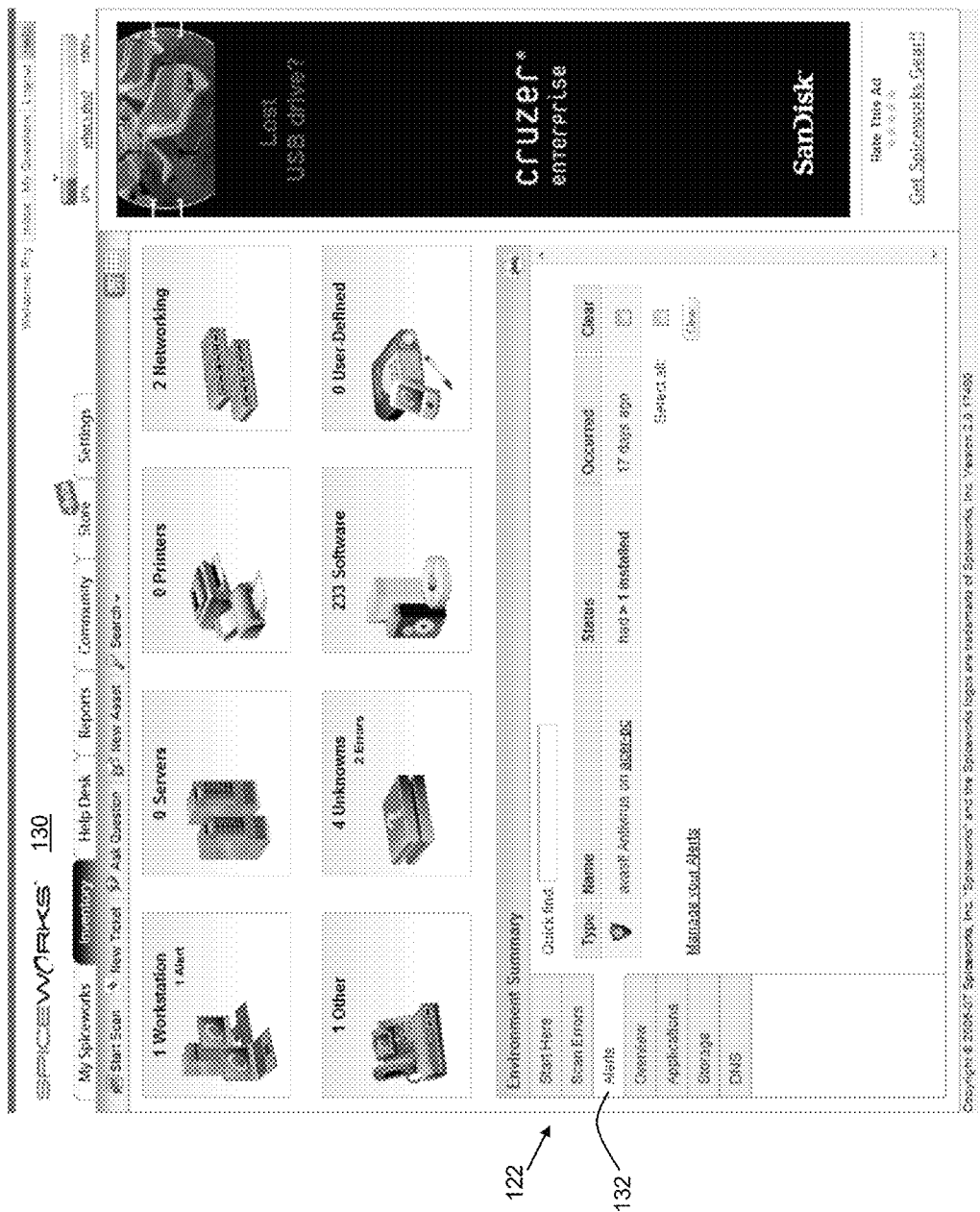

FIG. 2 shows a view 130 of Alerts tab 132 on the bottom half 122 of the screen. The Alerts tab 132 allows a user to see, at a glance, different alerts that have been fired for the entire network. In one embodiment, default alerts may include whether a machine is offline, is running out of disk space, or if anti-virus software is not up to date.

Figure 3:

FIG. 3 shows a view 140 of Storage tab 142 on the bottom half 122 of the screen. The Storage tab 142 allows a user to see all assets in the environment and how much hard disk space remains. A user may view that an asset is running out of disk space and proactively try to manage the issue before it becomes a problem.

Figure 4:
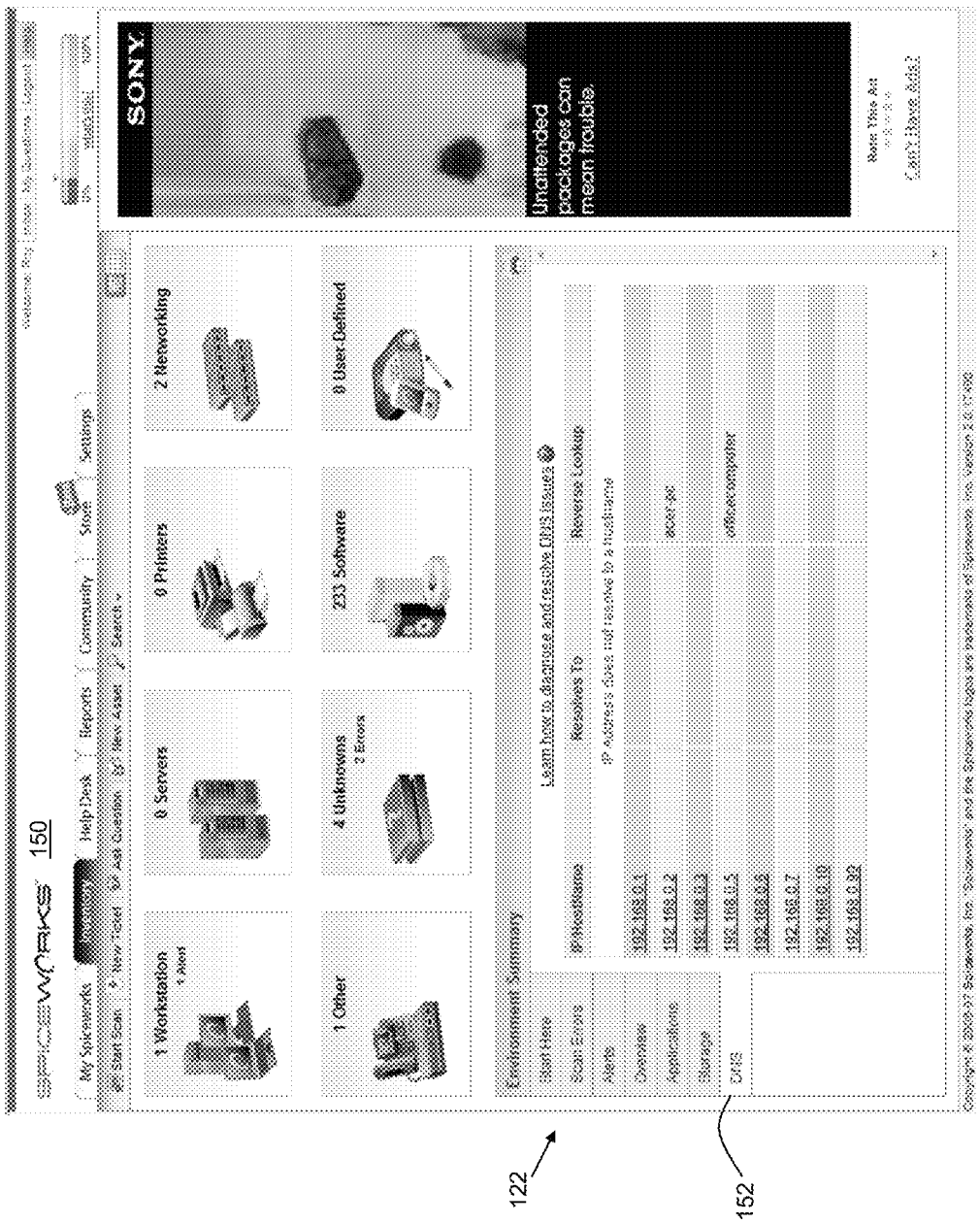

FIG. 4 shows a view 150 of DNS tab 152 on the bottom half 122 of the screen. The software will attempt to query a DNS server and make sure that it is configured correctly.

Figure 5:
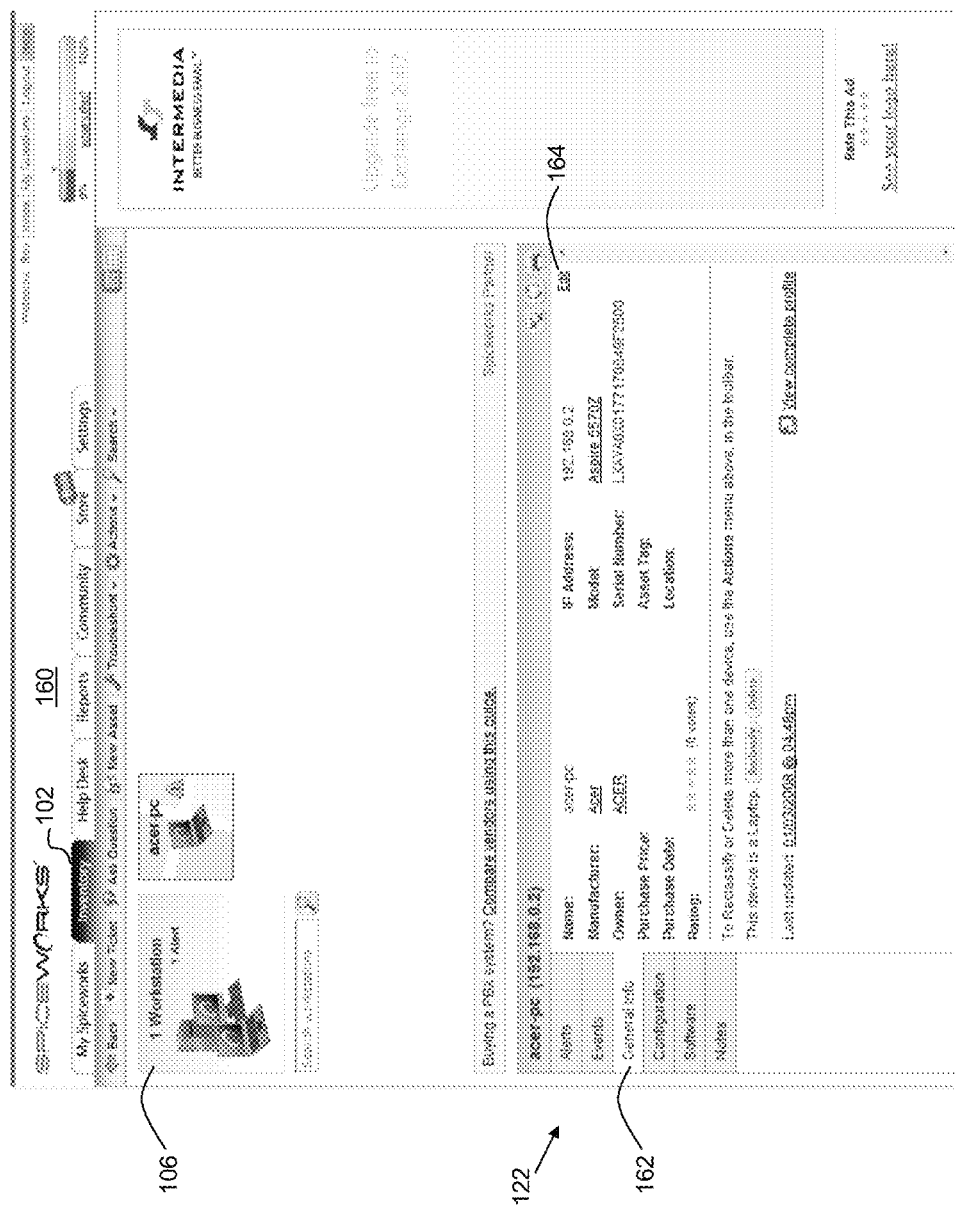

FIG. 5 shows a view 160 of one embodiment of the data a user may view related to a workstation upon clicking the Workstations 106 category under the inventory tab 102. In the embodiment shown, the General Info tab 162 at the bottom half 122 of the screen shows information collected by the software related to a workstation. Such information may include manufacturer, model, serial number and other information about the workstation. A user may manually enter information about the workstation by clicking the Edit tab 164. In the embodiment shown, such information may include purchase price, purchase date, asset tag and location.

Figure 6:
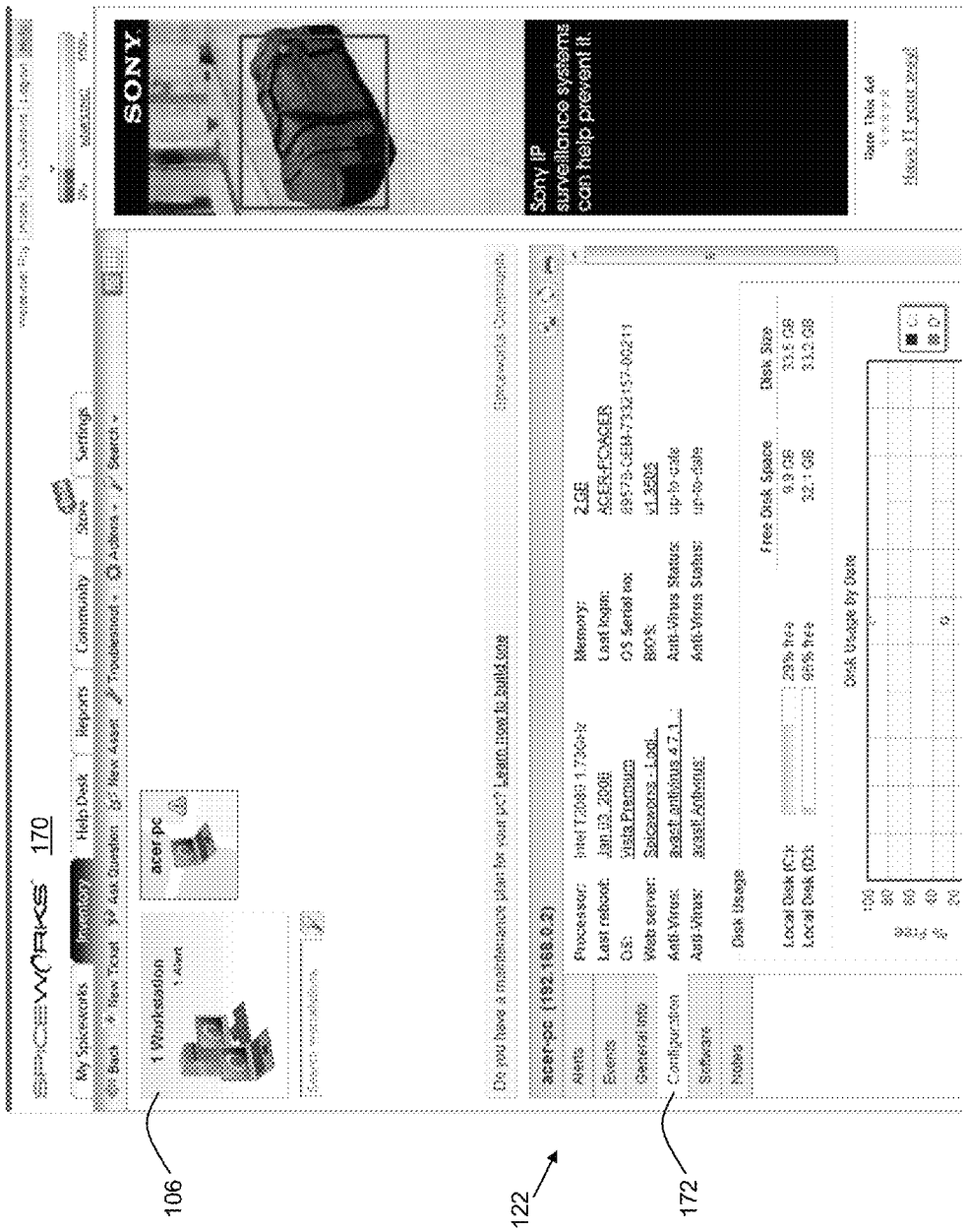

FIG. 6 shows a view 170 of Configuration tab 172 at the bottom half 122 of the screen. In the embodiment shown, reboot information, amount of memory, last login, BIOS among other information.

Figure 7:
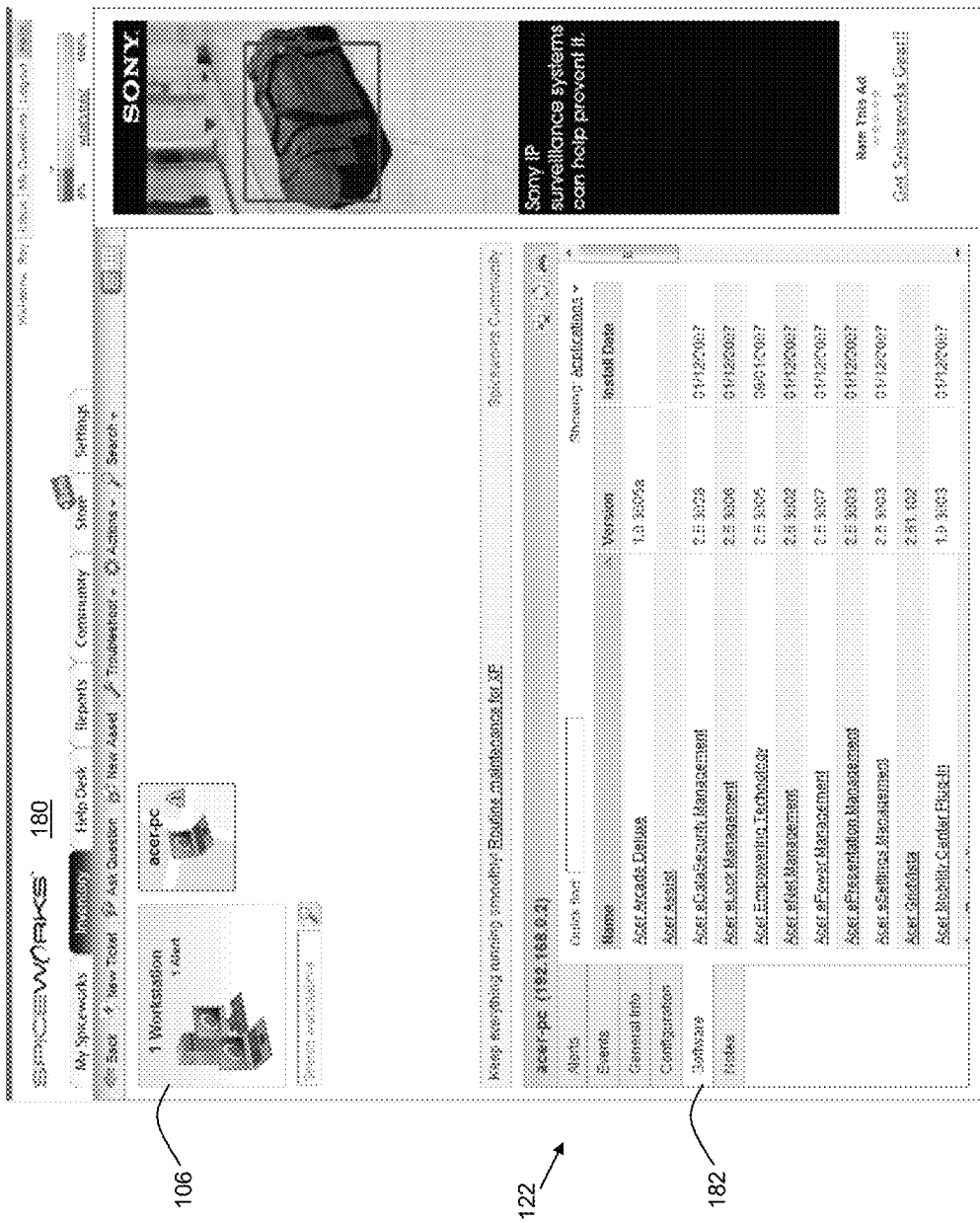

FIG. 7 shows a view 180 of Software tab 182 at the bottom half 122 of the screen. In the embodiment shown, all of the software installed on the device, what the version number, and when it was installed.

Figure 8:
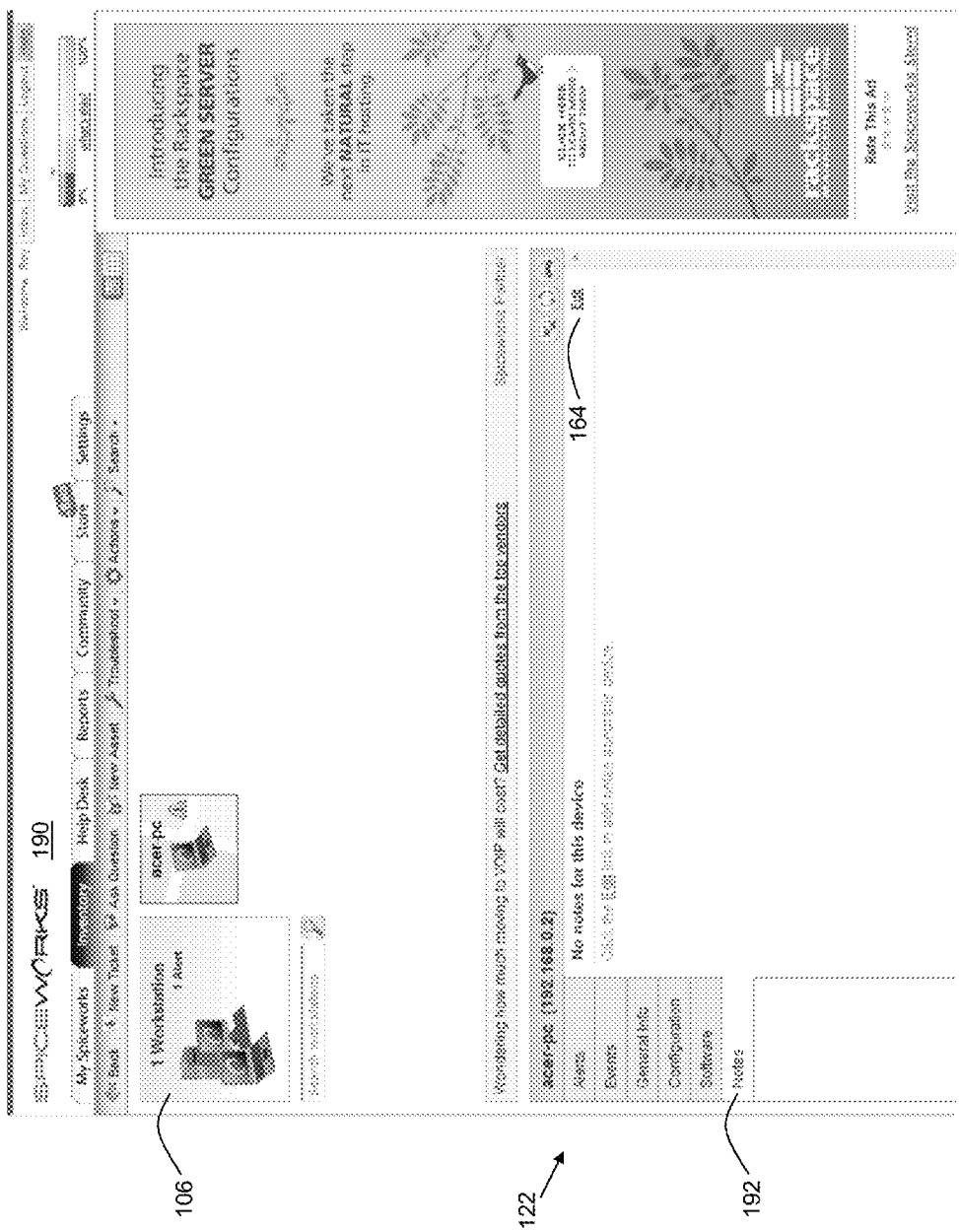

FIG. 8 shows a view 190 of Notes tab 192 at the bottom half 122 of the screen. In the embodiment shown, a user may enter notes about a workstation using Edit tab 164. For example, a user may want to make a note of problem issues associated with that workstation.

Figure 9:

FIG. 9 shows a view 200 of one embodiment of the data a user may view related to a workstation upon clicking the Software 118 category under the inventory tab 102. In the embodiment shown, the name 202 of the software, the oldest version 204 of the software on the network, the latest version 206 of the software on the network, the licenses 208 and number of installs 210 are displayed.

On the bottom half 122 of the screen, the General tab 212, Installed On tab 214, Not Installed tab 216, and Notes tab 218 are useful in managing licenses. For license compliance, a user may input the number of licenses available for a given software package. In the event that the number of installed versions of software exceeds the number of available licenses, an alert may be issued, indicating that the threshold for license compliance has been crossed. This may be a very powerful tool for a user to take to management to request purchases of additional required licenses. In addition, it may be useful for a user to be able to ensure that for a volume license, the same key is being used for each instance of installed software.

Figure 10:
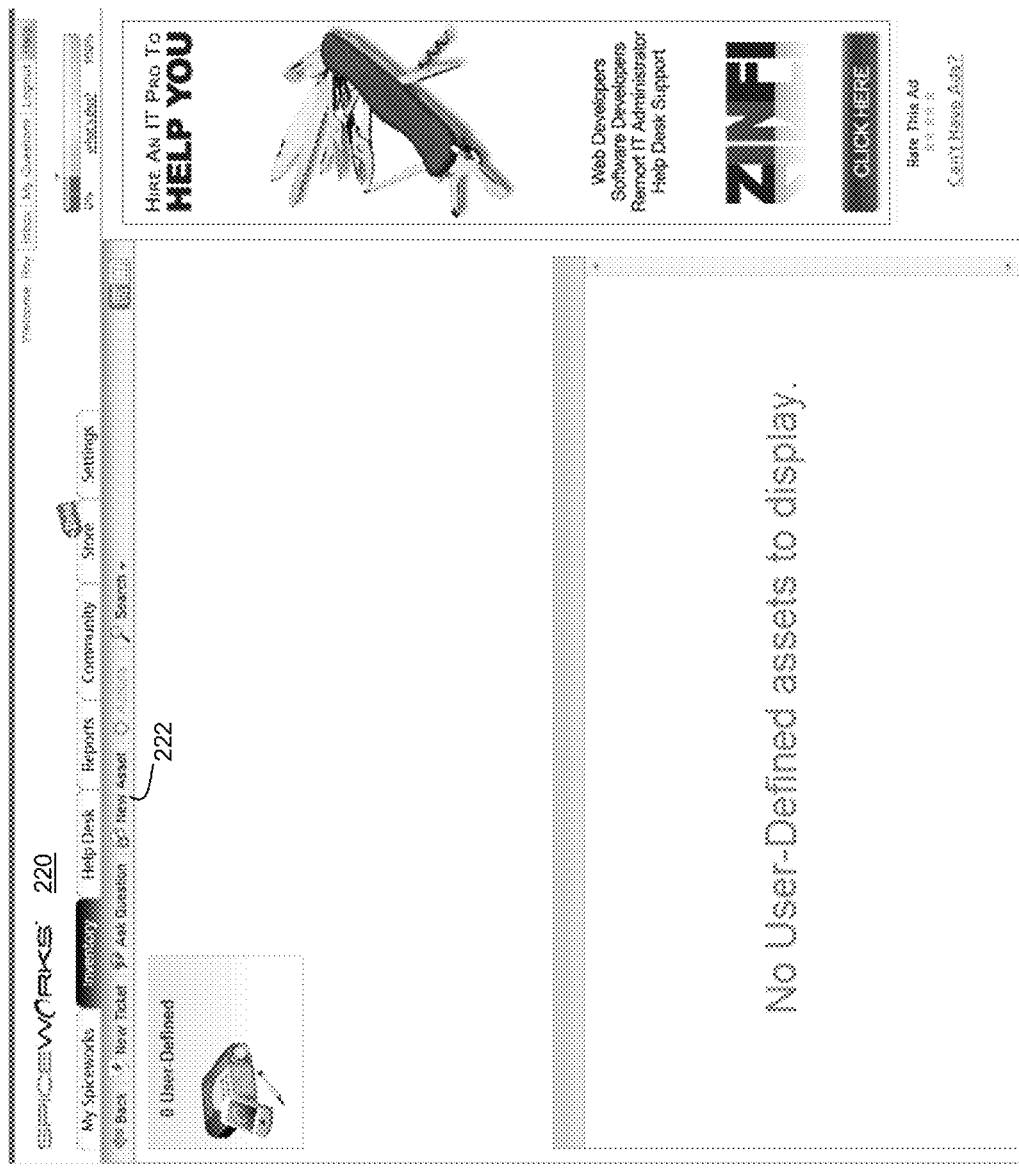
Figure 11:
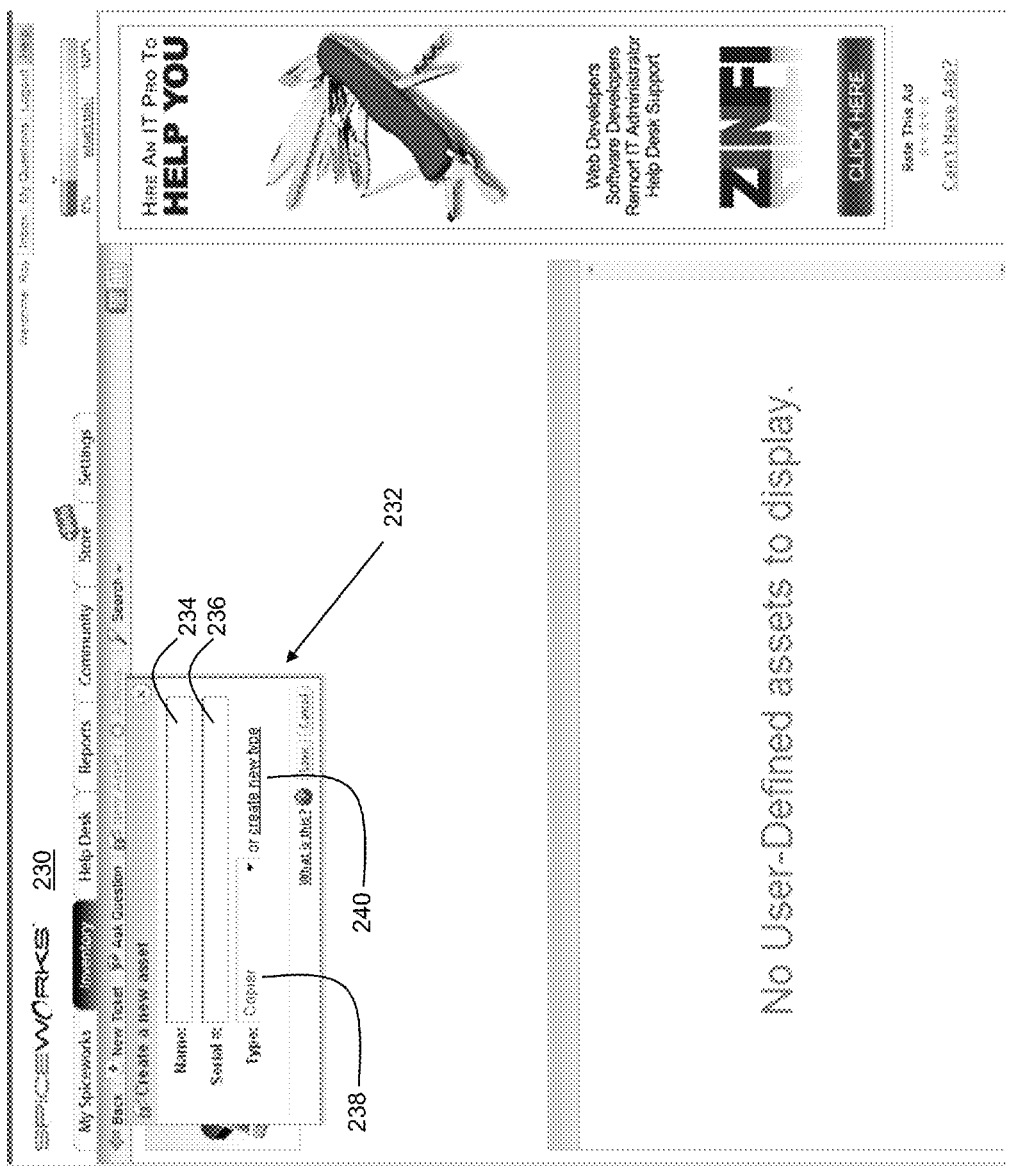

An IT administrator may also need to manage things that are not easily detectable on a network. In that case, there is a 'User Defined' category. FIG. 10 shows a view 220 of one embodiment of the data a user may view related to a workstation upon clicking the User-Defined tab 120 category under the inventory tab 102. For example, in order to track a new projector (not easily detectable on a network), a user may click the 'New Asset' tab 222. FIG. 11 shows a view 230 of one embodiment of a user pop-up 232 for entering information related to a new asset. For example, a user may enter Name 234 and Serial Number 236 as well as select a Type 238 from pre-defined categories. In one embodiment, the pre-defined categories in the Type 238 pulldown include Copier, desktop, Fax, Hub, Laptop, Printer, Router, Server, SnmpDevice, Switch, VoIPDevice and Wireless Access Point. Alternatively, a user may create a new type 240 by manually defining a category.

The disclosed subject matter also provides for an information technology (IT) help desk. Daily projects and user requests may be managed from one interface. A ticket may be created upon discovery of a network asset that requires attention while browsing a network. Clients may submit tickets with attachments via email or the Web and may then view the status of those tickets online. Tickets may be assigned across an IT team or attached to hardware on the network. reports may be run on the tickets to easily view due dates and which assets (or even departments) cause the most issues.

An internal help desk may greatly reduce the amount of time spent tracking work and responding to users and also makes it easy to report on the amount of time spent doing IT related activities. In one embodiment, the presently disclosed software is pre-configured with several of the most commonly used help desk options.

Figure 12:
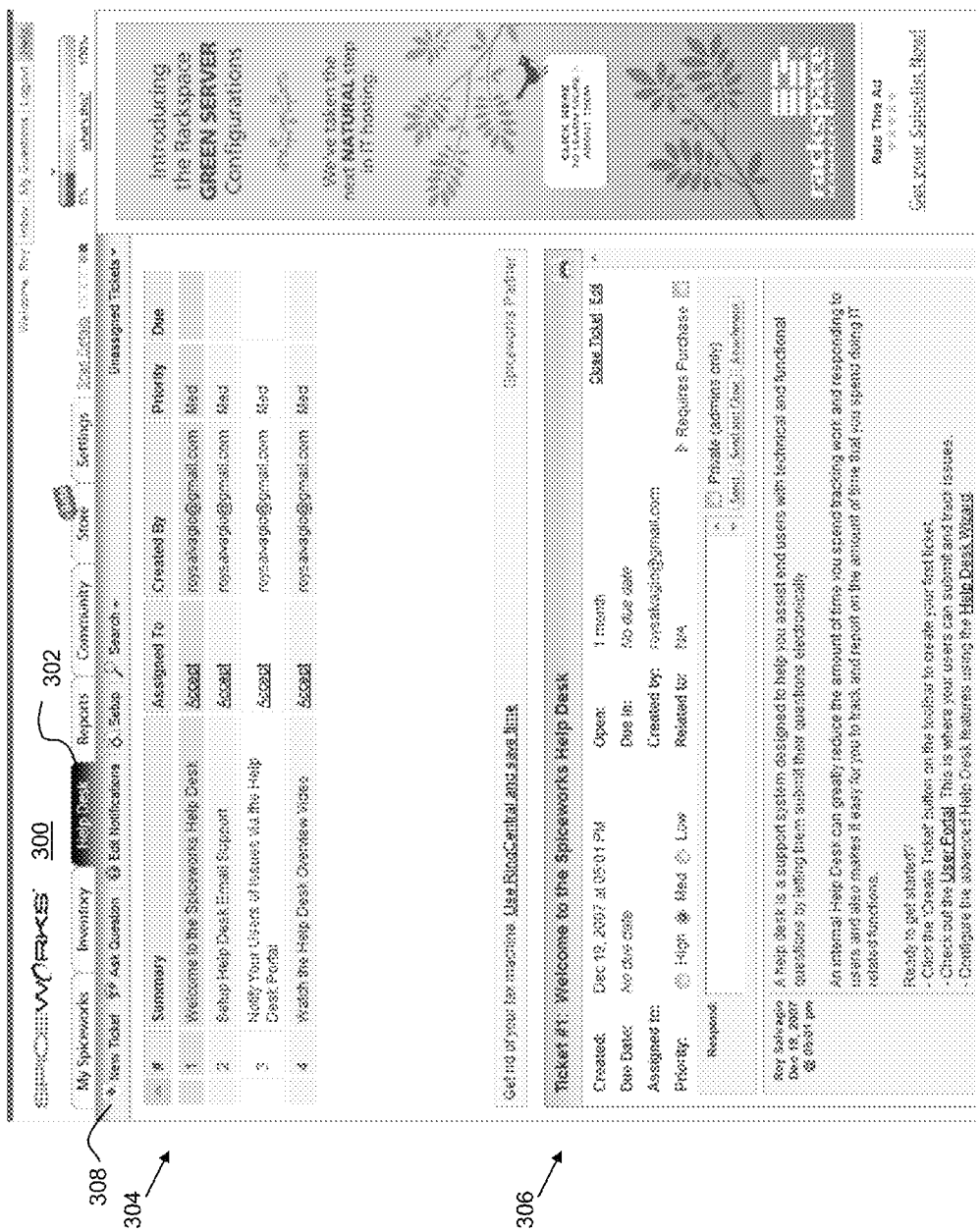
FIGS. 12 and 13 show views of the help desk tab of one embodiment of the disclosed subject matter.

FIG. 12 shows a view 300 of an embodiment of a help desk tab 302 of the present disclosure. As shown, the help desk is divided into two regions. The top half of the screen 304 shows current help requests while the bottom half of the screen 306 shows the details of a particular help request. In one embodiment, there are several ways to create a help request.

Figure 13:
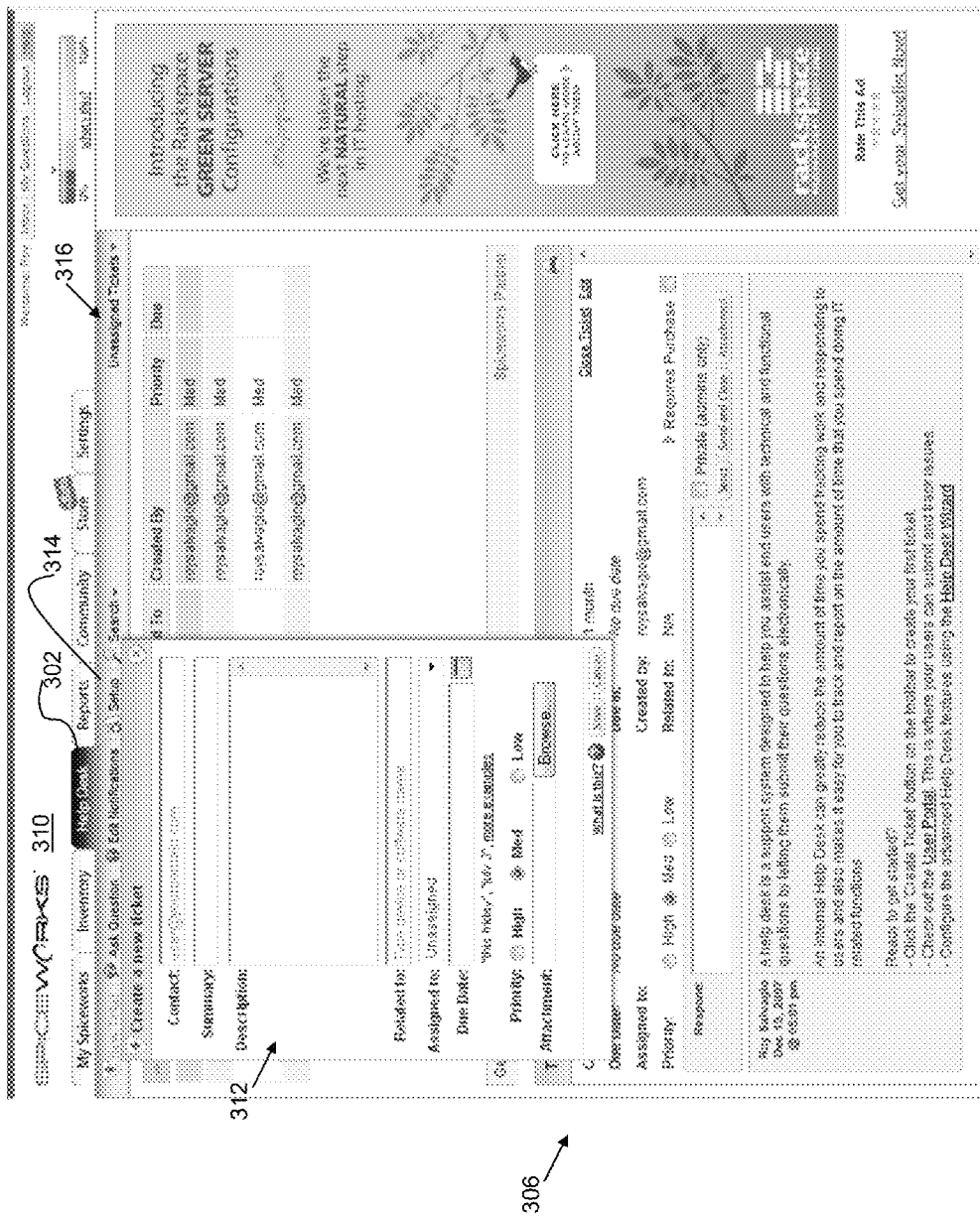

An administrator may create a help request within the presently disclosed software using the New Ticket tab 308. FIG. 13 shows a view 310 of a form for creating a new ticket 312 that appears when an administrator clicks on the New Ticket tab 308. In the embodiment shown, the form 312 includes Contact, Summary, Description, Related To, Assigned To, Due Date and Priority input fields. The form 312 also allows for the attachment of files using the Browse button. Alternatively, users may submit help desk requests by directly using the web interface (not shown) of the presently disclosed subject matter. This is available to anyone with a web browser, making it easy to submit a request, check on the status of a request, as well as reply. Alternatively, the help desk may automatically create help desk requests by allowing a user to send an email. This may be done by clicking the Setup tab 314.

In one embodiment, help desk tab 302 allows an administrator to select the tickets to be viewed 316 as unassigned tickets, open tickets, closed tickets, past due tickets, all tickets, tickets assigned to that administrator, and tickets where a purchase is required. Further, an administrator may make changes to a help desk request and correspond with a user using the features available on the bottom half of the screen 306.

The disclosed subject matter provides for reports for sharing IT information. Reports may include software installed on machines, disk usage across the network, trouble tickets recently created, among others. Further, custom reports may be created using a simple interface. Reports may be published or exported to PDF or Excel. Useful custom reports may be shared with other users.

Figure 14:
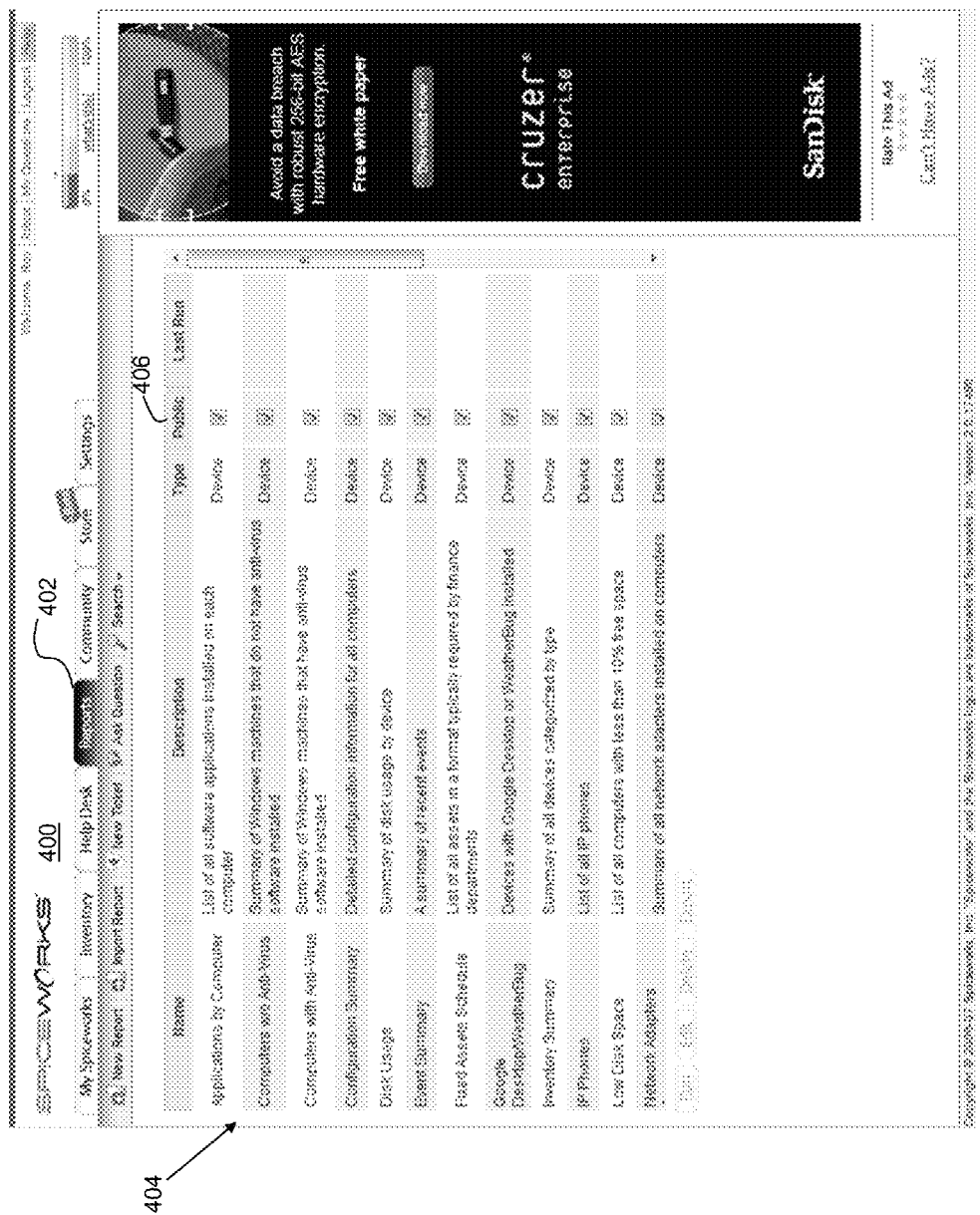
FIG. 14 through 16 show views of the reports tab of one embodiment of the disclosed subject matter.

FIG. 14 shows a view 400 of an embodiment of a reports tab 402 of the present disclosure. In one embodiment, default reports 404 include Applications by Computer, Computers without Anti-Virus, Computers with Anti-Virus, Configuration Summary, Disk Usage, Event Summary, Fixed Assets Schedule, Google desktop/WeatherBug, inventory Summary, IP Phones, Low Disk Space, Network Adapters Summary, Printers and Copiers, Server Event Summary, Services on Computers, Tickets by Device, Installed Applications, Software Compliance, Tickets by Software, All Tickets, Closed Tickets, Open Tickets, Reopened Tickets and Tickets Pending Purchase.

Note that the Public column 406 may be used to mark a report as available to other users. For example, a supervisor or accounting personnel may need to view reports regularly. Making a report public allows such a user to view the report from within the software of the disclosed subject matter.

Figure 15:
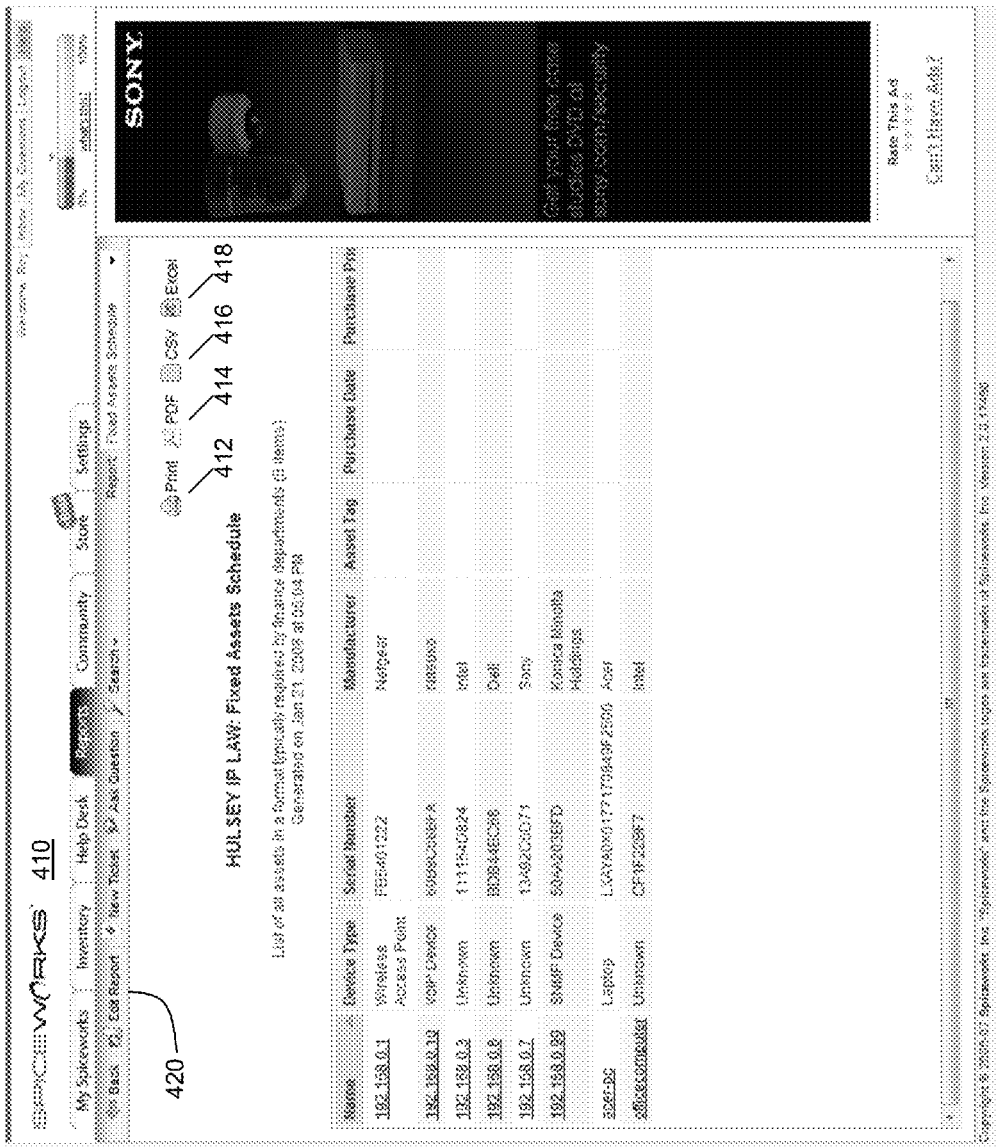

FIG. 15 shows a view 410 of one embodiment of a default report, a Fixed Assets Schedule. A user has the options to Print 412, export to PDF 414, Export as CSV file 416, or export to Excel 418. Further, a user may edit a report by clicking the Edit Report tab 420.

Figure 16:
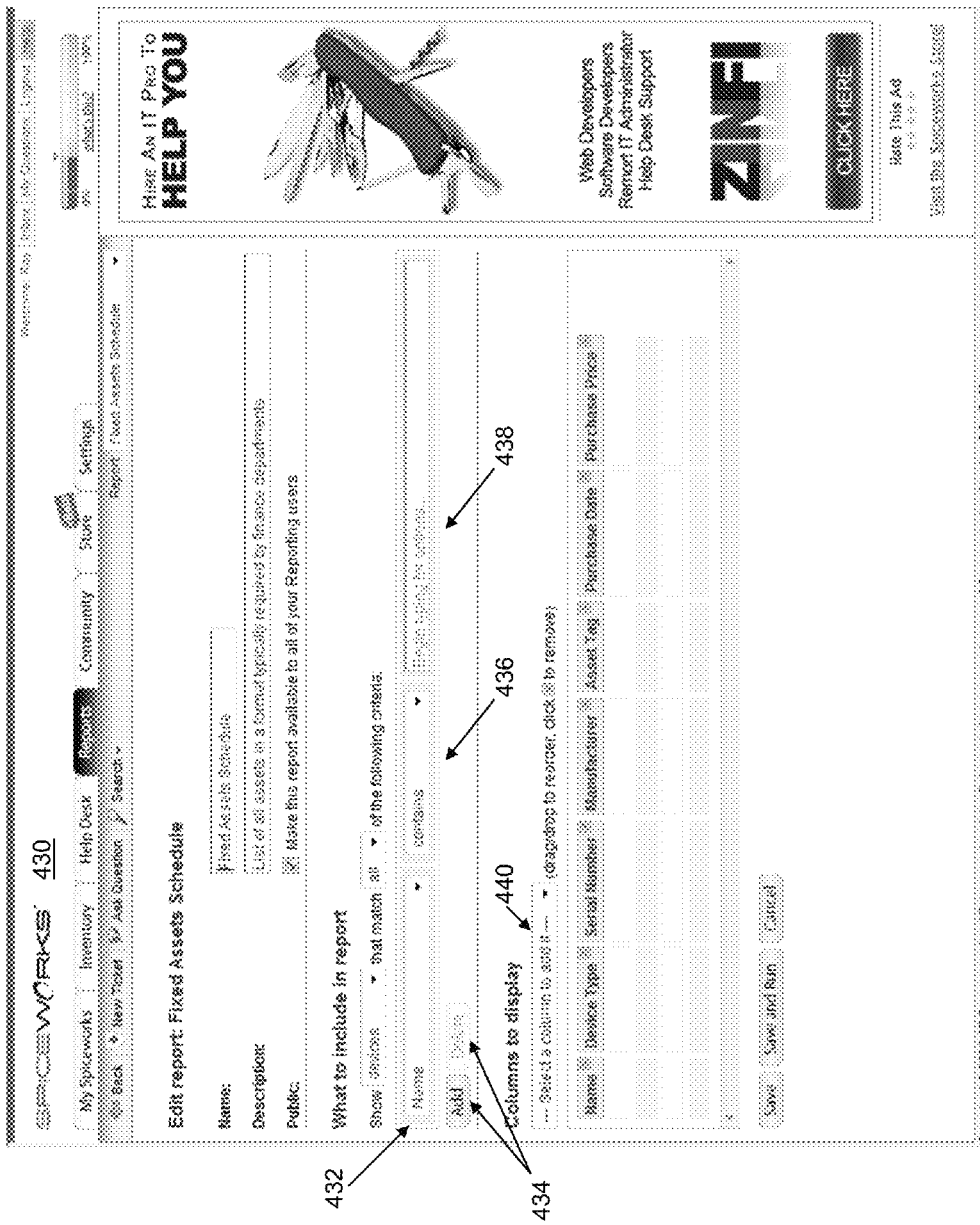

FIG. 16 shows a view 430 of one embodiment of the options available for editing a report. The Name dropdown 432 displays a list of available items to be included in the report. Add and Delete buttons 434 enable a user to add or delete items in the report. In one embodiment, criteria dropdown 436 may include such operators as is, is not, contains, does not contain, begins with, and ends with. Text input field 438 allows a user to manually input data. A user may select the columns for display in the report using the Columns to display dropdown 440.

The disclosed subject matter may also be used to monitor a network for trouble. A user may view, and set up alerts for, Windows events that occur across the environment for easily detecting, diagnosing and troubleshooting issues that disrupt a network. Further, the disclosed subject matter allows for automatic identification of PCs and servers with low disk space, the presence of unwanted software on the network, the status of anti-virus updates, printers with low toner and ink levels, and offline servers. Email alerts may be used for notification of potential issues. Further, valuable monitors are all consolidated in one centralized location.

Figure 17:
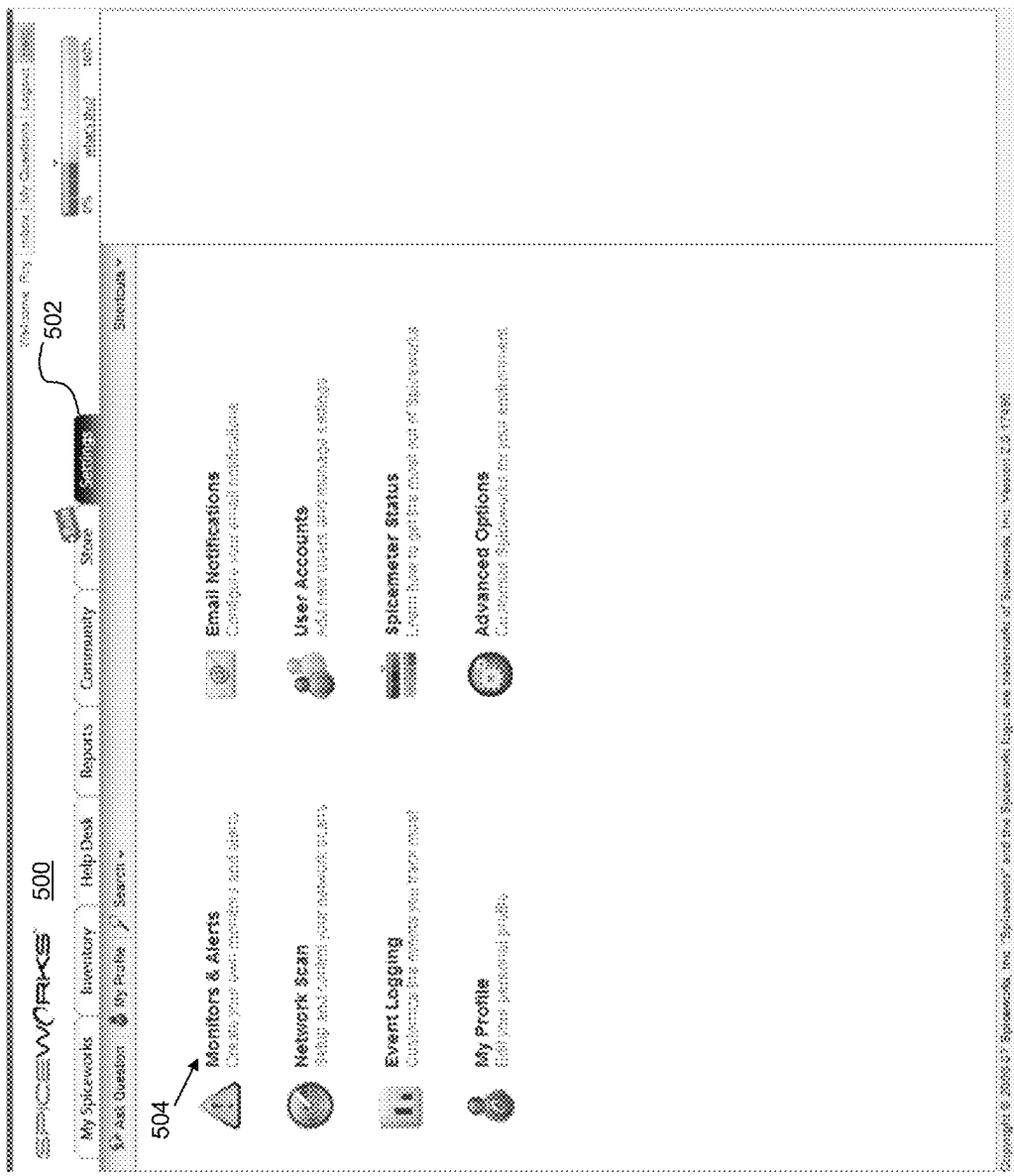
FIGS. 17 and 18 show views of the settings tab of one embodiment of the disclosed subject matter.
Figure 18:
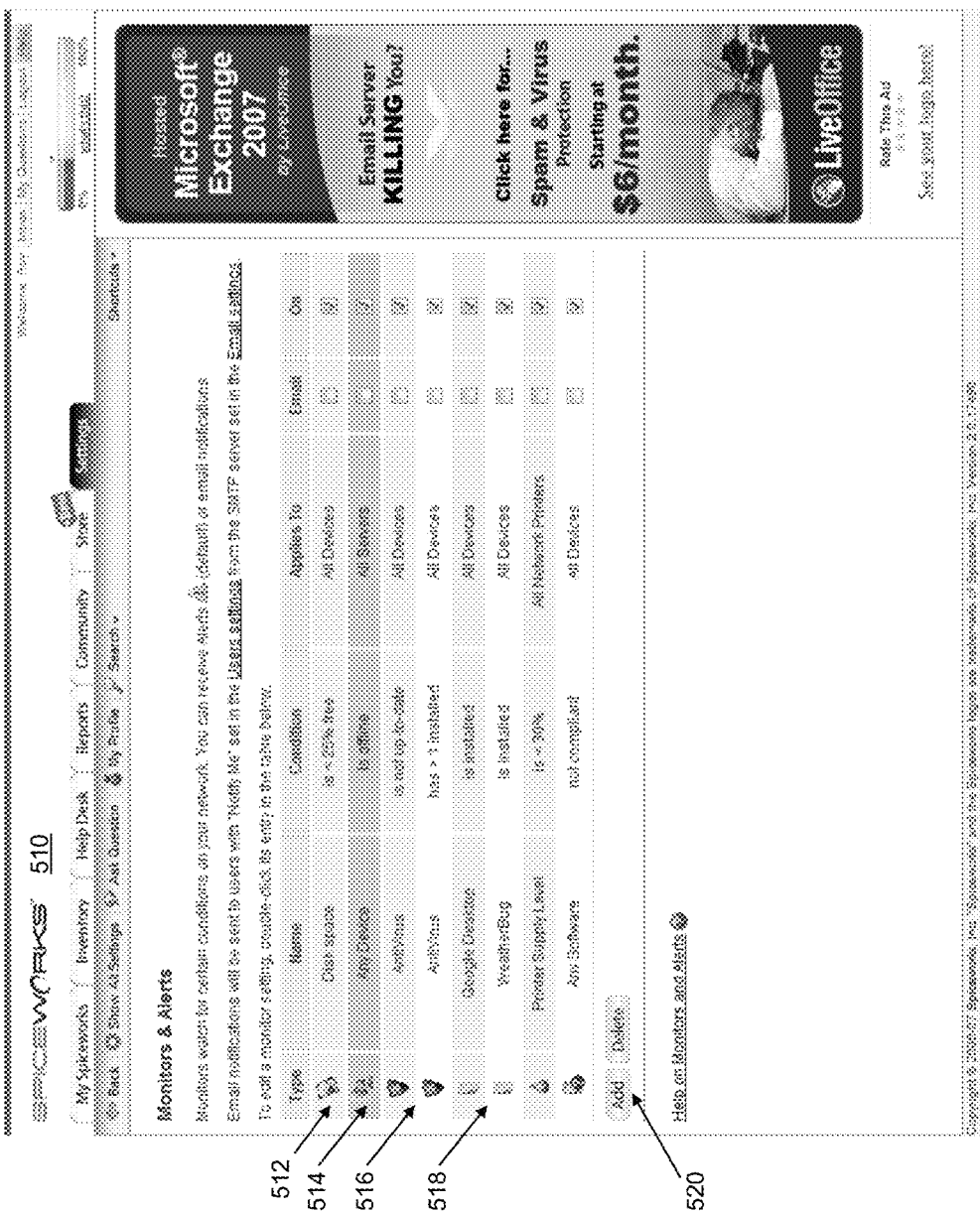

FIG. 17 shows a view 500 of an embodiment of settings tab 502 of the present disclosure, including a link to Monitors and Alerts 504, shown in view 510 of FIG. 18.

A monitor is any condition which can be automatically evaluated by the software of the present disclosure. In one embodiment, the default monitors include Disk Space 512 (amount of free disk space), Online/Offline Status 514 (online/offline status for a device or group of devices), Anti-Virus 516 (when anti-virus software is present and up to date), and Troublesome Software 518 (when specified software is removed or installed, including Google desktop and WeatherBug).

To add a new monitor, a user may click 'Add' 520. For example, an administrator may want to monitor when a new version of Microsoft Office Outlook is installed or uninstalled. This will result in an alert being fired in the event that Microsoft Outlook is installed or uninstalled. This is a powerful way of monitoring an environment without the need for manually checking each system in the environment.

The disclosed subject matter allows the user to report on the network. The software allows the user to see software installed on machines, disk usage, and trouble tickets. Custom reports can be created and published so that others in the network can be informed of network updates, and issues. reports may then be exported in file formats such as PDF and Excel. Finally, the user can share and receive report templates from other users of the software.

The disclosed subject matter allows a user to troubleshoot issues on the network. When problems arise, the software allows for identification of cause and resolution of the problem. For example, a user may see what software is running on a machine causing it to run slowly. A remote control tool may be launched from within the software. Two machines may be compared to determine what settings are different. The software allows for pinging a machine to see if it is online and running a traceroute to identify the flow of data. Further, the software allows a user to identify when a server is running out of capacity.

A user may troubleshoot a workstation with an issue by comparing that workstation with another workstation that is working correctly. The Compare tab allows a side by side comparison of a first machine versus a second machine. The software highlights in red any difference found in hardware, configuration, software, services or hotfixes. A user may also perform remote administration of machines via the Remote Control tab. The software uses two methods of remote control including Microsoft's Remote desktop protocol and VNC screen-sharing protocol.

Figure 19:
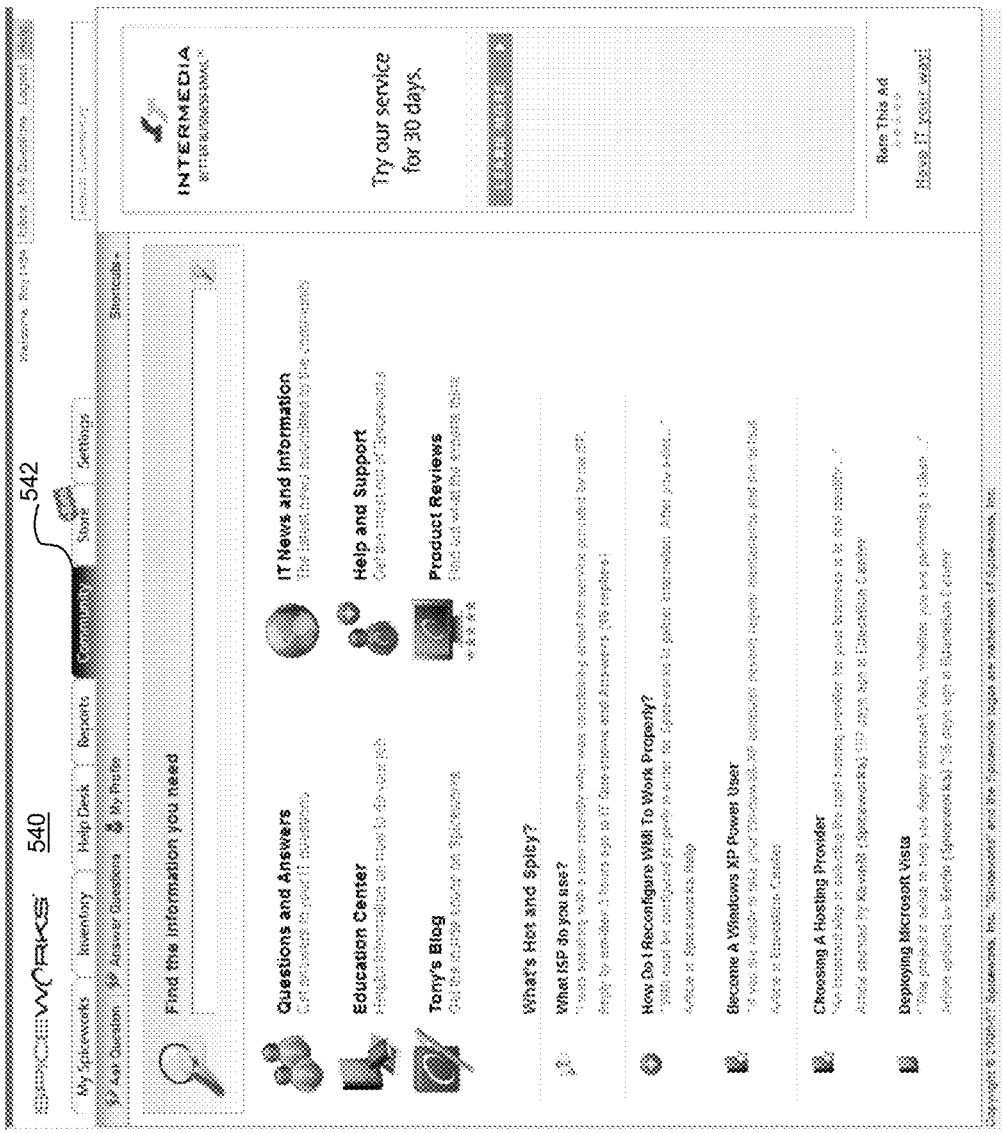
FIG. 19 shows a view of the community tab of one embodiment of the disclosed subject matter.

FIG. 19 shows a view 540 of an embodiment of community tab 542 of the present disclosure. The disclosed subject matter allows a user to collaborate with other IT professionals. For example, a user may receive ratings and recommendations, ask questions, get tips and support, or join discussions. The collaboration may allow a user to help author IT Wikipedia articles, all with an audience that is familiar with small and medium sized business IT issues. Further, a user may submit useful online IT news and information.

The disclosed subject matter allows a user to become a virtual extension of the software development team. A user may request and vote on new features, view other users' ratings of features, submit feedback on existing features, and preview upcoming releases.

Figure 20:
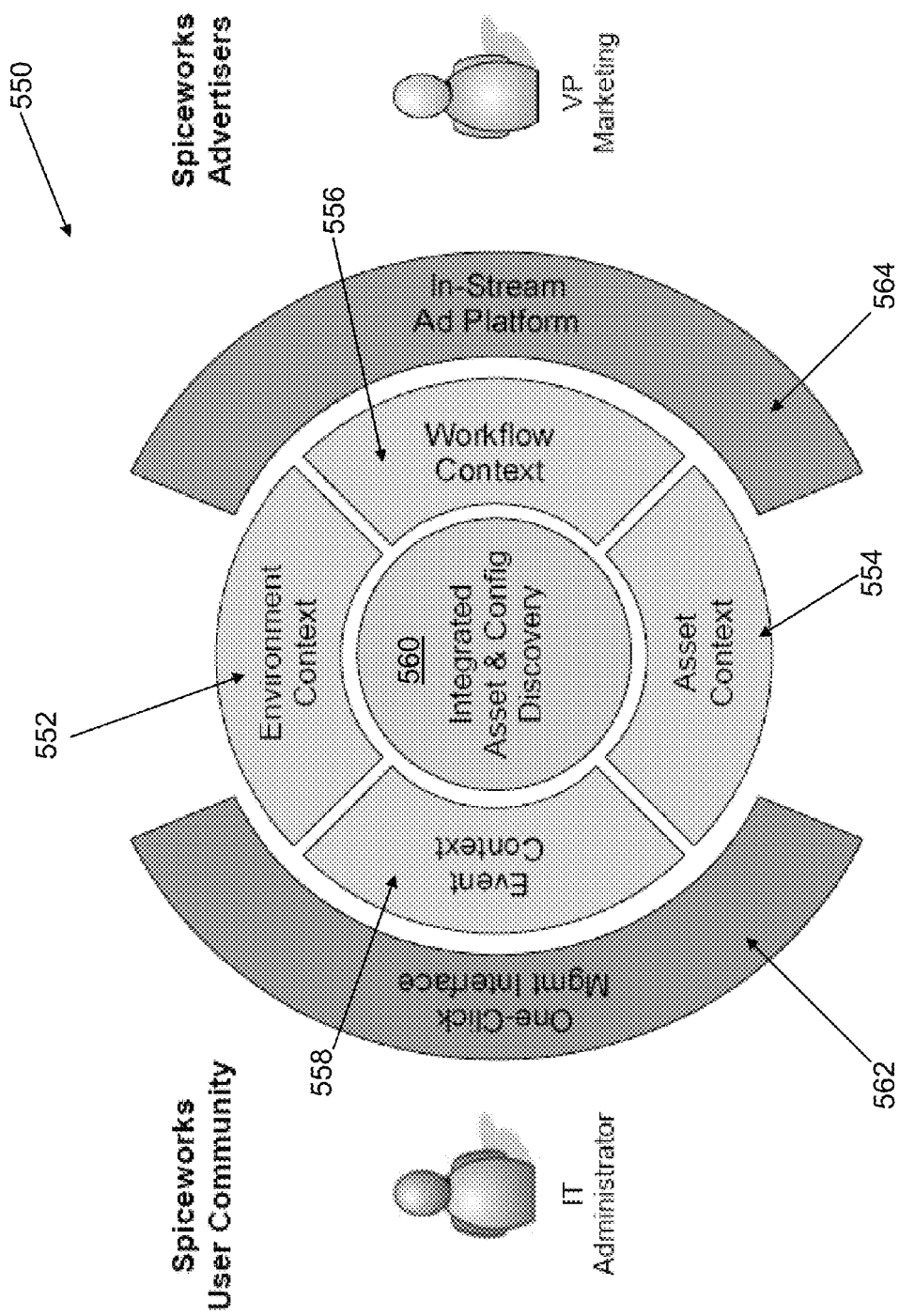
FIG. 20 shows a high level schematic architecture of the disclosed subject matter.

FIG. 20 shows a high-level architectural view 550 of one embodiment of the disclosed subject matter. The different contexts supporting the disclosed subject matter include an environment context 552, an asset context 554, a workflow context 556, and an event context 558. These contexts make up the integrated asset and configuration discovery 560 of the disclosed subject matter. All of the information is available to an IT administrator or other user via a one-click management interface 562, along with in-stream advertising platform 564.

The asset context engine 554 allows a user to view the network assets on an individual, group or global basis and generate reports, flags and alerts.

The event context engine 558 provides a user with insight into the system, such as access to critical or proprietary information, web-server activity as a security measure, or general activity of personnel after business hours.

The workflow context engine 556 is a smart engine providing the user with information based on the processes that user is currently running. The workflow context engine 556 analyzes the current work by the user and presents this data through the data pivoting interface. For instance, if an end of year inventory program is running, the workflow content engine 556 may direct the user to websites where identified or needed computer or network hardware, software or peripherals and be researched and purchased. Additionally the workflow content engine 556 may simply drive advertisements to the user relating to the user's perceived needs. The data pivoting will be further discussed later in the disclosure.

Figure 21:
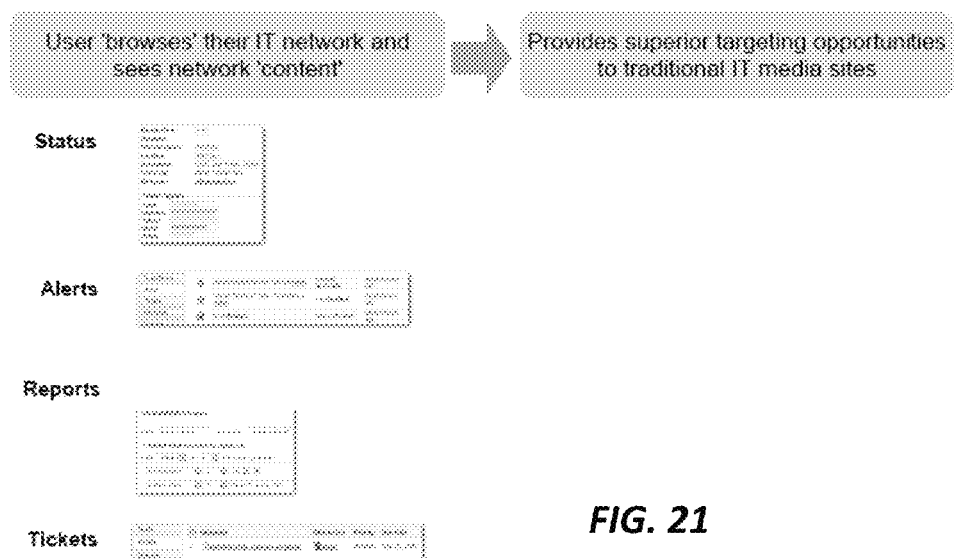
FIG. 21 shows how the presently disclosed network management system allows an IT administrator to browse an IT network and see network content, while IT equipment and software vendors obtain targeting opportunities for potential purchasers.

FIG. 21 shows how the disclosed subject matter allows an IT administrator to browse a network for network content, while IT equipment and software vendors obtain targeting opportunities for potential purchasers. The integrated asset and configuration and discovery software module, subroutine or engine 562 scans the network and provides information relating to the system and its components, such as type of computer, operating system, and other information. Additionally, the present system provides the user with system status (such as low ink); the system then alerts the user, reports on the problem (such as number of licenses; finally, a work order or purchase order tickets may be assigned.

Figure 22:
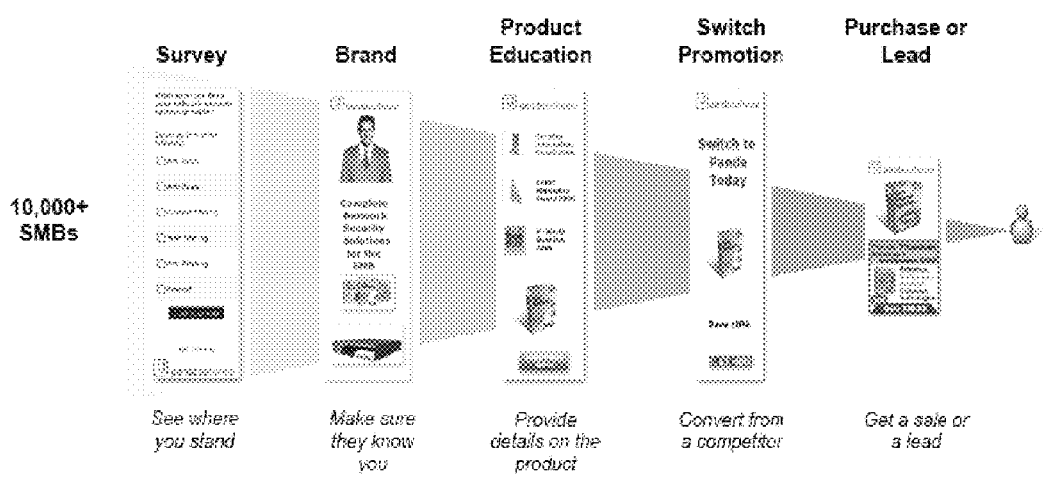
FIG. 22 depicts how the process of the present disclosure promotes purchase opportunities for buyers and sellers in an IT network environment.

FIG. 22 depicts how the process of the present disclosure promotes purchase opportunities for buyers and sellers in an IT network environment. For the advertiser/vendor community, the disclosed subject matter provides an in-stream advertising platform that tailors advertisements and product information to the particular needs of an enterprise network, the survey, product education and switch promotion steps. The disclosed subject matter allows for confidentiality and security within any network. Advertisements provide the user with options to purchase necessary components, such as software, memory or disk drives, represented by the brands and purchase or lead steps. Advertisement revenue allows the software to be distributed for free or at a reduced cost to the end user.

Figure 23:
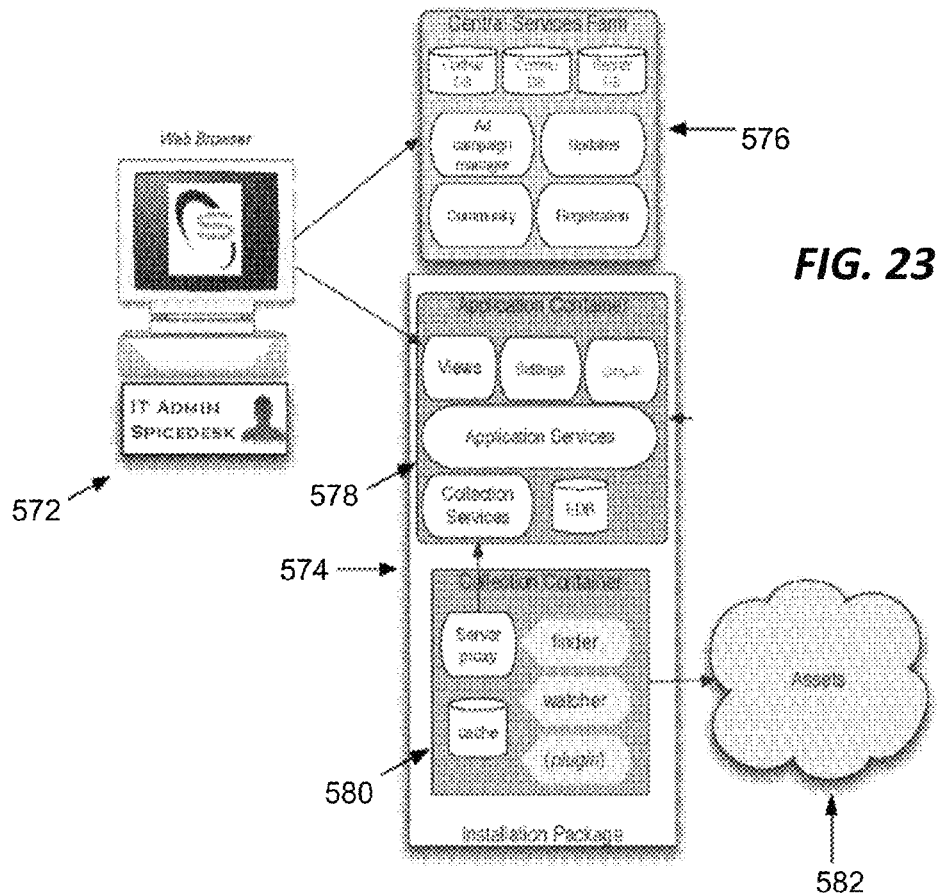
FIG. 23 shows how the presently disclosed system supports the activities of an IT network administrator.

FIG. 23 shows how the disclosed subject matter supports the activities of an IT network administrator. FIG. 23 depicts a user interface 572, typically manned by the IT administrator of the network. Software modules 574 and 576 are typically installed on a network to provide the functionality offered by the aspects of the present disclosure. Software engine 576 is typically hosted off-site from the user and gathers information from multiple users. Although in a far-flung world-wide organization, engine 576 may be implemented by a third-party for the benefit of the organization or by the IT department of the organization. The application engine 578 contains subroutines that provide the user with such functionality as views, setting, application services, collection of services and a host of other services. This list is meant to be exemplary and not limiting in any manner.

The collection engine 580 provides the user with server proxy, finder, watcher and third party functionality as aspects of the present disclosure. Engines 578 and 580 may be employed jointly in a network or separately. In a typical installation, engine 580 will be installed at multiple sites in a distributed network 582 or in a network that has several firewalls or security measures, downstream of them and then to provide retrieved information to the application engine 578. Although an IT administrator may change these settings, typically the application dynamically determines the appropriate IP addresses, domain names or other information required to gather the information.

Figure 24:
FIG. 24 shows an initial graphical user interface screen shot showing information with which a network administrator may download the presently disclosed IT network management system.

FIG. 24 shows an initial graphical user interface screen shot showing information on how a network administrator may download the software of the disclosed subject matter using a web browser.

Figure 25:
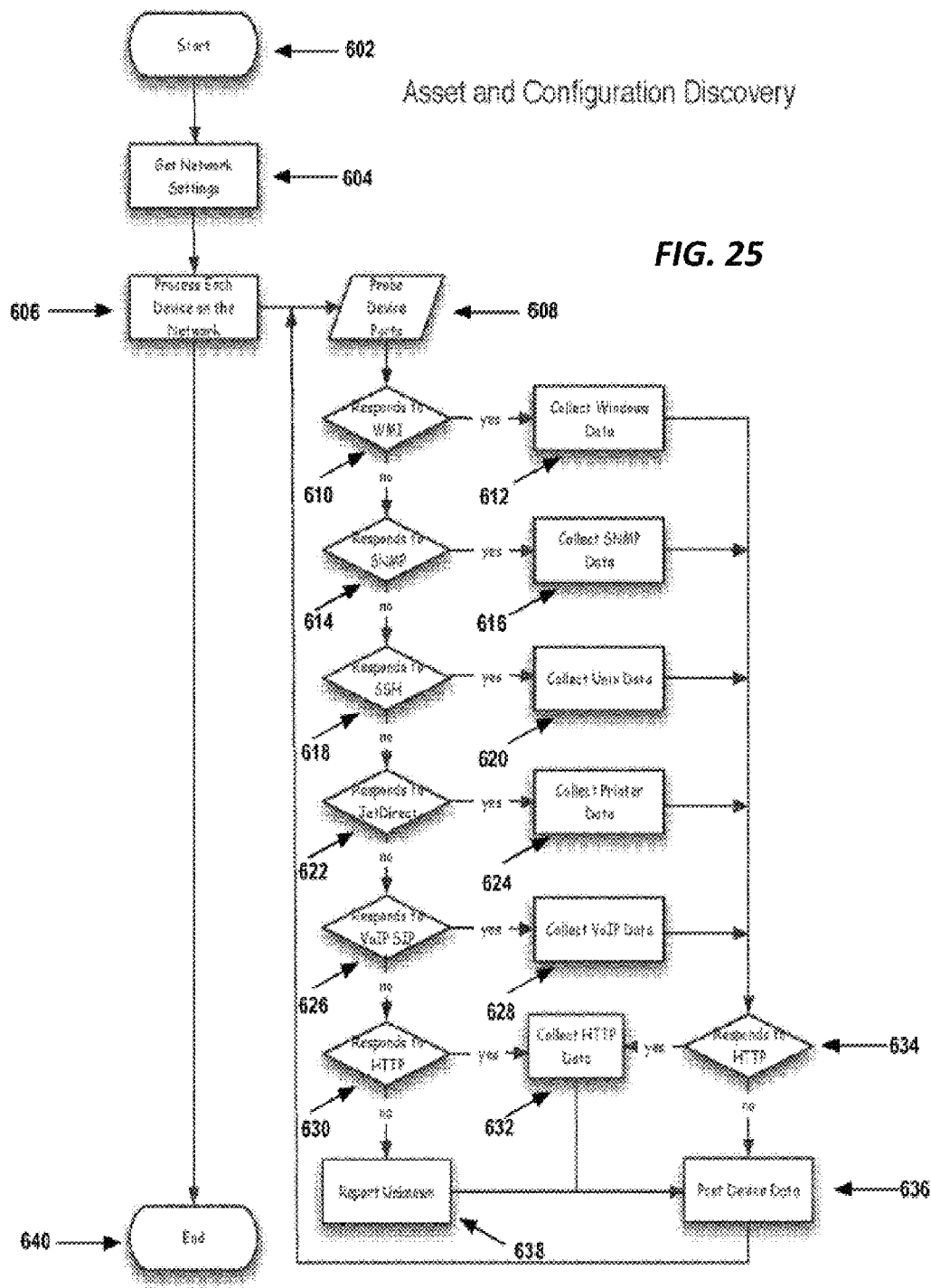
FIG. 25 presents a flow diagram for the asset and configuration discovery features of the disclosed subject matter.

FIG. 25 presents a flow diagram for the asset and configuration discovery features of the presently disclosed IT network management system;

FIG. 25 depicts a schematic flow diagram of the asset and configuration engine. In the scanning and discovery process, algorithms and parameters are initiated and launched as represent by start 602. Control then passes to obtain network settings 604. At this step information has been determined automatically but also may be provided to the application by the IT administrator, such as off-site IP addresses, domain names etc. that are part of the system and needs to be aggregated by central services engine are made accessible to be view by application engine.

This initial information may also include, any required security passwords or logins required to access some or all of the systems on the network. At step 604 the network settings are obtain as well as checking of the domain name and the DNS lookup in both directions. Any DNS errors found are aggregated into a top level view so that they later may be corrected by the IT administrator if desired.

An identifier for a computer or device on a TCP/IP network. Networks using the TCP/IP protocol route messages based on the IP address of the destination. The format of an IP address is a 32-bit numeric address written as four numbers separated by periods. Each number may be zero to 255. For example, 2.160.10.240 could be an IP address.

Within an isolated network, IP addresses may be assigned at random as long as each one is unique. However, connecting a private network to the Internet requires using registered IP addresses (called Internet addresses) as specified by networking standards. The four numbers in an IP address are used in different ways to identify a particular network and a host on that network. Four regional Internet registries—ARIN, RIPE NCC, LACNIC and APNIC—assign Internet addresses from the following three classes. Class A—supports 16 million hosts on each of 126 networks; Class B—supports 65,000 hosts on each of 16,000 networks; and Class C—supports 254 hosts on each of 2 million networks.

In a 32-bit IP address, the number of bits used to identify the network and the host vary according to the network class of the address. In a Class C network, the first 3 bits, or the high-order bits, are always "110." The next 21 bits are used to define the Class C network, and the final eight bits are used to identify the host. The IP address is represented in dotted decimal notation of four 8-bit fields, or octets, that have been converted from binary to decimal numbers.

The number of valid networks and hosts available is always $2^N$ (where N equals the number of bits used) minus 2 (one for the all zeros address and one for the all ones address). Thus, for a class C address wherein 8 bits are available for hosts, the number of hosts is $2^8-2$, or 256−2, which is 254. Future version of this software will support Ipv6 which allows for a much greater range of IP addresses.

At step 604 a determination is made as to how wide the system is and to allocate search protocols based on this measure. For instance in a Class C network there are 254 potential hosts. Each device has or should have a unique IP address or sub-mask address. If an IP address or name is provided by the IT administrator, a DNS lookup takes place. The present disclosure confirms the DNS name and IP address associated with it and assures that the IP address defaults to the DNS name and vice-versa. If an IP address or name is not provide the search engine 606 will the set the range based on the how wide the system is and ping each element to see if it responds. If an element does respond then it is probed to see if it is listed on one of the ports or is a unique name or IP address device.

Having "ping"-ed an element and it responds, control then passes to step 608 where the element is probed. Although the following steps are listed in a logical and efficient manner for probing elements on a network, other groupings or searching hierarchies may be employed or plugged in later and not depart from the scope of the present disclosure.

At step 610 the device is probed to see if it responds to WMI. Windows Management Instrumentation (WMI) is a set of extensions to the Windows Management Instrumentation that provides an operating system interface through which instrumented components may provide information and notification. If the device is identified as a WMI device data is collected at step 612 and control passes to step 634 where a determination as to whether the device responds to HTTP is made (i.e., has a web server interface). Hypertext Transfer Protocol (HTTP) is a method used to transfer or convey information on the World Wide Web.

If the device is found to be a WMI at step 610 the remaining steps 610 through 630 are skipped, since by default the device will not respond to any of the other protocols. At step 614 the device is probed to see if it responds to SNMP. The simple network management protocol (SNMP) forms part of the internet protocol suite as defined by the Internet Engineering Task Force (IETF). SNMP is used by network management systems to monitor network-attached devices for conditions that warrant administrative attention. It consists of a set of standards for network management, including an Application Layer protocol, a database schema, and a set of data objects.

If at step 614 the device responds, it is identified as a SNMP device data is collected at step 616 and control passes to step 634 where a determination as whether the device responds to HTTP. The remaining steps 618-630 are skipped. The simple network management protocol (SNMP) forms part of the internet protocol suite as defined by the Internet Engineering Task Force (IETF). SNMP is used by network management systems to monitor network-attached devices for conditions that warrant administrative attention. It consists of a set of standards for network management, including an Application Layer protocol, a database schema, and a set of data objects.

At step 618 if the device responds, it is identified as a SSH device, data is collected at step 620 and control passes to step 634 where a determination as whether the device responds to HTTP is made. Steps 622-630 are skipped. Secure Shell or SSH is a set of standards and an associated network protocol that allows establishing a secure channel between a local and a remote computer. It uses public-key cryptography to authenticate the remote computer and (optionally) to allow the remote computer to authenticate the user. Shell commands are then used to obtain the needed information from the asset.

At step 622 if the device responds, it is identified as a JetDirect device, data is collected at step 624 and control passes to step 634 where a determination as whether the device responds to HTTP is made. Steps 626-630 are skipped. JetDirect is the name of a technology sold by Hewlett-Packard that allows computer printers to be directly attached to a Local Area Network. The most common communication uses TCP/IP port 9100.

At step 626 if the device responds, it is identified as a VoIP SIP, data is collected at step 628 and control passes to step 634 where a determination as to whether the device responds to HTTP is made. Voice over Internet Protocol, also called VoIP, IP Telephony, Internet telephony, Broadband telephony, Broadband Phone and Voice over Broadband is the routing of voice conversations over the Internet or through any other IP-based network.

At step 630 if the device responds, it is identified as an HTTP and data is collected at step 632. Control then passes to step 638, wherein if no response is received and exception report or alert is generated and forwarded to the IT administrator providing the directions as to how to handle these occurrences.

The reason the device failed to respond or did not respond fully, after being identified as being on the system could be numerous. In this instance the port is identified as being open but is identified as not showing anything on it. This could occur for various reasons, such as the user may not have the security clearance to access the system/device in question or a separate login is required that was not provided. The device may be behind a firewall or other device such a hub that will not respond.

Once the data is collected control then passes to step 636 wherein the data collect is posted with each device found on the network. Process steps 606 may be repeated again at a later time to discovery new network devices, but a report will only be generated for devices previously identified if the device configuration has changed. This information is stored on the system so that a history of the device may be created and used to compare with itself or other devices similarly configured and equipped.

This provides for a very efficient way of trouble shooting devices by being able to access a snap shot of a device that was previous working. It also provides the IT administrator the functionality and ability to ensure that each user on the system is appropriately configured with the software, hardware, peripheral access and etc. that their security level or access level requires or allows. Therefore, it a system bios or other parameters are changed and a problem occurs, the IT administrator may utilize this tool to identify the change in the systems configuration at take appropriate measures to resolve it.

Figure 26:
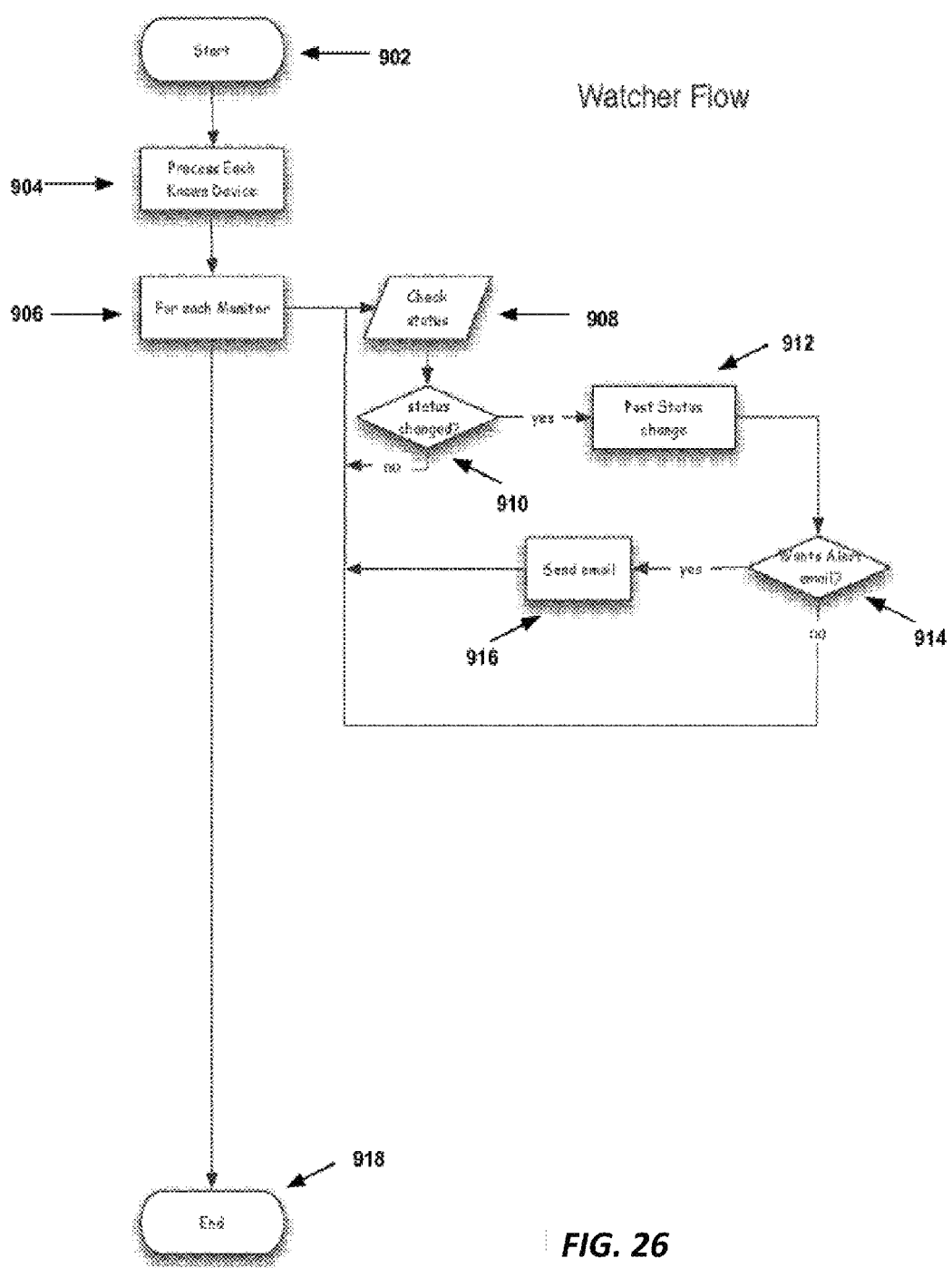
FIG. 26 presents a flow diagram for a watcher flow functions of the disclosed subject matter.

FIG. 26 presents a flow diagram for a watcher flow functions of using a schematic diagram of a watcher or monitoring engine. This aspect of the present disclosure monitors identified devices on the system at periodic times. It mainly looks for devices that switch states between online and offline and sends flags these events for the IT administrator as discussed below. For large organizations, the monitoring engine may segment the total number of devices and monitor each segment in a rotating fashion as not to over tax the operating systems. Although, this should not be a concern, since the data gathered and transmitted is on the order of 10s of K and require very little system resources to run.

Therefore, in most instances the user will not even be aware of the programming scanning operation. Alternately, the present disclosure may be directed to only run when system resources are above a certain level (i.e. 60% or 80%) to ensure that productivity is not hampered by the scanning and transmitting of data process.

At step 902 the monitoring or watcher flow engine is initiated with the parameters set by the IT administrator. Control then passes to step 904 where each known device is processed. Control then passes to step 906 for each monitor where a check status request is initiated at step 908. If the result of the check status is a positive, i.e., the status has changed, the status change is posted to set 912. If the check status request is a negative, i.e., a no result, the process terminates.

Once the change is posted at step 912, control then passes to step 914, where a determination is made, in compliance with the IT administrator set up instructions, to send an email or some other type alert, such as creating an exception report, or log. If the determination at step 914 is a no, then the process terminates, although the data is still stored with the device showing the time of the last scan and its results. This data may remain indefinitely on the system or be periodically culled using a FIFO method over a set time period. If the instructions are affirmative at step 914 to send an email, control passes to step 916 where an email or some other type alert is direct to the party or parties designated by the IT administrator.

The watcher flow or monitoring engine continually performs the various described functions at the period intervals set up for the monitoring process until the process is terminated or altered by the IT administrator.

While the present disclosure has been described with respect to a limited number of embodiments, those skilled in the art, having benefit of this disclosure, will appreciate that other embodiments may be devised which do not depart from the scope of the present disclosure as described herein. Accordingly, the scope of the present disclosure should be limited only by the attached claims.

The invention claimed is:

1. A method for providing the status of a local network by a network management system integrating work-flow monitoring and reporting of a host computer of said local network, said local network comprising interconnected information technology devices, said method comprising the steps of:
    providing said network management system comprising a network management system server from said local network, said server comprising a processor, memory, and a network connection, providing to said host computer of said local network an inventory acquisition application, said inventory acquisition application installed on said host computer, said inventory acquisition application pre-configured with algorithms and parameters for automatic asset and configuration discovery of preexisting platform management systems and protocols on information technology devices associated with said local network from said host computer;
    initiating an inventory of all information technology devices associated with said local network of information technology devices from said host computer;
    said steps of initiating an inventory of information technology devices, determining the operational status of a plurality of inventoried information technology devices, and determining the status of software programs performed automatically by said monitoring software program using said algorithms and parameters for discovery of information technology devices associated with said local network by discovering said preexisting platform management systems and protocols on said information technology devices without the use of a client side agent associated to said local network monitoring software;
    wherein said determining the operational status of each of said inventoried information technology devices comprises sequentially probing each of said plurality of inventoried information technology devices until each of said plurality of inventoried technology devices is responsive, wherein sequentially probing comprises:
        probing in Windows Management Instrumentation (WMI);
        probing in Simple Network Management Protocol (SNMP);
        probing in SSH;
        probing in Jet Direct;
        probing in VoIP SIP; and
        probing in HTTP,
    collecting windows data for each of said plurality of inventoried information technology devices responding to said probe in Windows Management Instrumentation;
    collecting SNMP data for each of said plurality of inventoried information technology devices responding to said probe in Simple Network Management Protocol;
    collecting unix data each for said plurality of inventoried information technology devices responding to said probe in SSH;
    collecting printer data for each of said plurality of inventoried information technology devices responding to said probe in Jet Direct;
    collecting VoIP data for each of said plurality of inventoried information technology devices responding to said probe in VoIP SIP;
    collecting HTTP data for each of said plurality of inventoried information technology devices responding to said probe in HTTP;
    aggregating collected windows data, SNMP data, unix data, printer data, VoIP data, and HTTP data to collected data;
    wherein said network management system determines from said collected data the operational status and status of software programs of each of said inventoried information technology devices;
    providing by said network management system a maintenance platform for performing remote maintenance of said local network.

2. The method of claim 1, wherein said inventory initiating step further comprises the step of initiating an inventory of all computer systems associated with said local network.

3. The method of claim 1, wherein said inventory initiating step further comprises the step of initiating an inventory of all peripheral printing devices associated with said local network.

4. The method of claim 1, wherein said inventory initiating step further comprises the step of initiating an inventory of all server devices associated with said local network.

5. The method of claim 1, wherein step of determining the operational status of a plurality of said information technology devices further comprises the step of determining changing conditions of a computer system memory device for a computer associated with said local network.

6. The method of claim 1, wherein step of determining the operational status of a plurality of said information technology devices further comprises the step of determining the installation of software of a plurality of computing systems associated with said local network.

7. The method of claim 1, wherein step of determining the operational status of a plurality of said information technology devices further comprises the step of determining the presence of antivirus software on computer stations associated with said local network.

8. A system for providing the status of a local network of interconnected information technology devices, comprising:
   a host computer for operating computing instructions and storing said computing instructions on a computer readable medium, said host computer associated with a local network of information technology devices;
   instructions for downloading a local network monitoring software program from an online source onto said host computer system, said monitoring software program pre-configured with algorithms and parameters for automatic asset and configuration discovery of information technology devices associated with said local network from said host computer;
   instructions for installing said local network monitoring software on said host computer;
   instructions operable on said host computer for communicating between said host computing system and said information technology devices for initiating an inventory of all information technology devices associated with said local network of information technology devices;
   instructions operable on said host computing system for communicating with said inventoried information technology devices for determining the operational status of a plurality of said information technology devices;
   instructions operable on said host computing system for communicating with said information technology devices for determining the status of software programs installed on said information technology devices;
   instructions operable on said host computing system for initiating an inventory of information technology devices, said instructions for determining the operational status of a plurality of inventoried information technology devices, and said instructions for determining the status of software programs performed by utilizing preexisting platform management systems and protocols on said information technology devices without the use of a client side agent associated to said local network monitoring software;
   wherein said instructions operable on said host computing system comprises instructions for sequentially probing each of said plurality of inventoried information technology devices until each of said plurality of inventoried technology devices is responsive, wherein sequentially probing comprises:
      probing in Windows Management Instrumentation (WMI);
      probing in Simple Network Management Protocol (SNMP);
      probing in SSH;
      probing in Jet Direct;
      probing in VoIP SIP; and
      probing in HTTP,
   instructions for collecting windows data for each of said plurality of inventoried information technology devices responding to said probe in Windows Management Instrumentation;
   instructions for collecting SNMP data for each of said plurality of inventoried information technology devices responding to said probe in Simple Network Management Protocol;
   instructions for collecting unix data each for said plurality of inventoried information technology devices responding to said probe in SSH;
   instructions for collecting printer data for each of said plurality of inventoried information technology devices responding to said probe in Jet Direct;
   instructions for collecting VoIP data for each of said plurality of inventoried information technology devices responding to said probe in VoIP SIP;
   instructions for collecting HTTP data for each of said plurality of inventoried information technology devices responding to said probe in HTTP;
   instructions for aggregating collected windows data, SNMP data, unix data, printer data, VoIP data, and HTTP data to collected data;
   instructions for determining from said collected data the operational status and status of software programs of each of said inventoried information technology devices;
   instructions operable on said host computing system for displaying information relating to the operational status and status of software programs on said information technology devices in a user interface on said host computing system; and
   instructions operable on said host computing system for allowing a user of said host computer system to initiate maintenance and support actions in response to said operational status and said status of software programs using said local network monitoring software.

9. The system of claim 8, wherein said instructions for initiating an inventory further comprise instructions for initiating an inventory of all computer systems associated with said local network.

10. The system of claim 8, wherein said instructions for initiating an inventory further comprise instructions for initiating an inventory of all peripheral printing devices associated with said local network.

11. The system of claim 8, wherein said instructions for initiating an inventory further comprise instructions for initiating an inventory of all server devices associated with said local network.

12. The system of claim 8, further comprising instructions for determining the operational status of said information technology devices further comprises instructions for determining changing conditions of a computer system memory device for a computer associated with said local network.

13. The system of claim 9, further comprising instructions for determining the operational status of said information technology devices further comprises instructions for determining the installation of software of a plurality of computing systems associated with said local network.

14. The system of claim 8, further comprising instructions for determining the operational status of said information technology devices further comprises instructions for determining the presence of antivirus software on computer stations associated with said local network.

15. A local network of information technology devices having the ability to inventory and determine the status of interconnected information technology devices, comprising:
   a plurality of communication paths forming a local network of interconnected information technology devices comprising a host computer and a plurality of computer workstations and at least one peripheral device;

said host computer for operating computing instructions and storing said computing instructions on a computer readable medium, said host computer associated through said local network of information technology devices;

instructions for downloading from a local network monitoring software program from an online source onto said host computer system, said monitoring software program pre-configured with algorithms and parameters for automatic asset and configuration discovery of information technology devices associated with said local network from said host computer;

instructions operable on said host computer for communicating between said host computing system and said information technology devices for initiating an inventory of all information technology devices associated with said local network of information technology devices;

wherein said instructions operable on said host computing system comprises instructions for sequentially probing each of said plurality of inventoried information technology devices until each of said plurality of inventoried technology devices is responsive, wherein sequentially probing comprises:
  probing in Windows Management Instrumentation (WMI);
  probing in Simple Network Management Protocol (SNMP);
  probing in SSH;
  probing in Jet Direct;
  probing in VoIP SIP; and
  probing in HTTP, instructions for collecting windows data for each of said plurality of inventoried information technology devices responding to said probe in Windows Management Instrumentation;

instructions for collecting SNMP data for each of said plurality of inventoried information technology devices responding to said probe in Simple Network Management Protocol;

instructions for collecting unix data each for said plurality of inventoried information technology devices responding to said probe in SSH;

instructions for collecting printer data for each of said plurality of inventoried information technology devices responding to said probe in Jet Direct;

instructions for collecting VoIP data for each of said plurality of inventoried information technology devices responding to said probe in VoIP SIP;

instructions for collecting HTTP data for each of said plurality of inventoried information technology devices responding to said probe in HTTP;

instructions for aggregating collected windows data, SNMP data, unix data, printer data, VoIP data, and HTTP data to collected data;

instructions for determining from said collected data the operational status and status of software programs of each of said inventoried information technology devices;

instructions operable on said host computing system for communicating with said information technology devices for determining the operational status of a plurality of said inventoried information technology devices;

instructions operable on said host computing system for communicating with said information technology devices for determining the status of software programs installed on said information technology devices;

instructions operable on said host computing system for initiating an inventory of information technology devices, said instructions for determining the operational status of a plurality of inventoried information technology devices, and said instructions for determining the status of software programs performed by utilizing preexisting platform management systems and protocols on said information technology devices without the use of a client side agent associated to said local network monitoring software;

instructions operable on said host computing system for displaying information relating to the operational status and status of software programs on said information technology devices in a user interface on said host computing system; and instructions operable on said host computing system for allowing a user of said host computer system to initiate maintenance and support actions in response to said operational status and said status of software programs using said local network monitoring software.

16. The local network of information technology devices of claim 15, wherein said instructions for initiating an inventory further comprise instructions for initiating an inventory of all computer systems associated with said local network.

17. The local network of information technology devices of claim 15, wherein said instructions for initiating an inventory further comprise instructions for initiating an inventory of all peripheral printing devices associated with said local network.

18. The local network of information technology devices of claim 15, further comprising instructions for determining the operational status of said information technology devices further comprises instructions for determining the installation of software of a plurality of computing systems associated with said local network.

* * * * *